United States Patent
Land et al.

(10) Patent No.: US 6,807,533 B1
(45) Date of Patent: Oct. 19, 2004

(54) WEB-BASED METHOD AND SYSTEM FOR MANAGING ACCOUNT RECEIVABLES

(75) Inventors: David MacLeod Land, Mississauga (CA); Alan Bruce Getgood, Mississauga (CA)

(73) Assignee: General Electric Canada Equipment Finance G.P., Quebec (CA)

( * ) Notice: Subject to any disclaimer, the term of this patent is extended or adjusted under 35 U.S.C. 154(b) by 0 days.

(21) Appl. No.: 09/563,135

(22) Filed: May 2, 2000

(51) Int. Cl.[7] .............................................. G06F 17/60
(52) U.S. Cl. ...................................................... 705/30
(58) Field of Search ............................ 705/30, 31, 32, 705/33, 34

(56) References Cited

U.S. PATENT DOCUMENTS

| | | | |
|---|---|---|---|
| 4,913,295 A | | 4/1990 | Murphy et al. |
| 5,121,945 A | | 6/1992 | Thomson et al. |
| 5,326,959 A | | 7/1994 | Perazza |
| 5,383,113 A | | 1/1995 | Kight et al. |
| 5,483,445 A | | 1/1996 | Pickering |
| 5,550,734 A | | 8/1996 | Tarter et al. |
| 5,611,052 A | | 3/1997 | Dykstra et al. |
| 5,684,965 A | | 11/1997 | Pickering |
| 5,704,044 A | | 12/1997 | Tarter et al. |
| 5,732,400 A | | 3/1998 | Mandler et al. |
| 5,774,882 A | | 6/1998 | Keen et al. |
| 5,774,883 A | | 6/1998 | Andersen et al. |
| 5,799,286 A | * | 8/1998 | Morgan et al. ................ 705/30 |
| 5,869,821 A | | 2/1999 | Lee et al. |
| 5,873,072 A | | 2/1999 | Kight et al. |
| 5,878,403 A | | 3/1999 | DeFrancesco et al. |
| 5,903,878 A | | 5/1999 | Talati et al. |
| 5,911,776 A | * | 6/1999 | Guck .......................... 709/217 |
| 5,930,776 A | | 7/1999 | Dykstra et al. |
| 5,956,690 A | * | 9/1999 | Haggerson et al. ............ 705/3 |
| 6,029,149 A | | 2/2000 | Dykstra et al. |
| 6,041,312 A | * | 3/2000 | Bickerton et al. ............. 705/30 |
| 6,044,362 A | | 3/2000 | Neely |
| 6,070,150 A | | 5/2000 | Remington et al. |
| 6,073,104 A | | 6/2000 | Field |
| 6,112,190 A | | 8/2000 | Fletcher et al. |
| 6,119,137 A | * | 9/2000 | Smith et al. ................. 707/523 |
| 6,134,563 A | * | 10/2000 | Chancey et al. ............. 707/503 |
| 6,209,860 B1 | | 4/2001 | Fehringer et al. |
| 6,233,565 B1 | | 5/2001 | Lewis et al. |
| 6,418,420 B1 | * | 7/2002 | DiGiorgio et al. ............ 705/40 |
| 2001/0047332 A1 | * | 11/2001 | Gonen-Friedman et al. .. 705/40 |

FOREIGN PATENT DOCUMENTS

| | | |
|---|---|---|
| EP | 1 130 529 A1 | 5/2001 |

OTHER PUBLICATIONS

Derfler, Frank J. et al. How Networks Work, Millennium Ed., Que Corporation, Jan. 2000.*
White, Ron, How Computers Work Millennium Ed. Que Corporation, Sep. 1999.*
Gralla, Preston, How the Internet Works, Millennium Ed., Que Corporation, Aug. 1999.*
Horngren, Charles T., et al, Introduction to Financial Accounting, Revised 3rd Ed., Prentice–Hall, Inc., 1988.*

* cited by examiner

*Primary Examiner*—Andrew J. Fischer
(74) *Attorney, Agent, or Firm*—Armstrong Teasdale LLP

(57) ABSTRACT

The Account Receivables System is a web-based system and method for collecting, tracking and processing information about a client's account receivables. The system is divided into several separate modules fully capable of interfacing with each other as well as the client's Order, Ship, Bill (OSB) system. The ARS produces a variety of reports, in a flexible format, on-line and downloads as soon as they are generated in the ARS. The ARS maintains close security over the system by providing an option for accepting the credit card information from the customer's OSB or through the ARS web site.

29 Claims, 20 Drawing Sheets

| FILE EDIT VIEW GO FAVORITES HELP |
| --- |
| ← → ⊗ ⟲ ⌂ ◎ ▽ ▽ ▽ ▽ |
| BACK FORWARD STOP REFRESH HOME SEARCH FAVORITES PRINT FONT MAIL |
| CASH APPLICATION CREDIT INQUIRY ARC MAINTENANCE ADMINISTRATION BULLETIN LOG IN/OUT HELP |

327      INQUIRY ENTRY           03/10/2000

CUSTOMER NO. ☐

SELECT AGEING WANTED  [A▽]   A = LATEST AGING
(ENTER A,B OR C)              B = LAST PERIOD END
                              C = NEXT PERIOD END

┌─SELECT──────────────────┐
│ ⊙ ALL INVESTMENT        │
│ ○ SPECIAL INVESTMENT    │
└─────────────────────────┘

[ OK (F1) ]    [ END (F3) ]

[ INV SEL (i) ]  [ CUST INQ (q) ]  [ DET AGE (g) ]  [ P/S INT (z) ]

```
FILE EDIT VIEW GO FAVORITES HELP
 ←   →   ⊗    □    ⌂    ⊙       □▽   ⊿    A▽ ▽   □
BACK FORWARD STOP REFRESH HOME SEARCH FAVORITES PRINT FONT MAIL EDIT
CASH APPLICATION  CREDIT INQUIRY  ARC MENU  MAINTENANCE  ADMINISTRATION  BULLETIN  LOG IN/OUT  HELP
```

304         CUSTOMER METHOD SELECTION         03/11/2000

CMI       CUST/MICR/INV          NAME                          C
                                                               0
CHEQUE NO.       CH. DATE        DEPOSIT AMOUNT                0
                 BATCH           REMIT

CUSTOMER NO. [          ]    NEW MICR [          ]
NAME         [                              ]
DEFINER                                            APPL METH [ ▽]

514 — CITY [                    ]    POSTAL CODE [          ]
      SELECT METHOD                       PAYOR IS
516 — ☐ ACCOUNT DESCENDING    FROM [    ]          TO [    ]
      ☐ FINDER NO DISP        FROM [    ]          TO [    ]
520 — ☐ STATEMENT BALANCE
522 — ☐ INVOICE NO. ENTRY
      ☐ INVOICE AMT. ENTRY           [  ] [  ] [  ] [  ]
      ☐ INVOICE NO. AND AMT.
      ☐ TOTAL CUST. DISP.
524 — ☐ PAY FROM OLDEST
530 — ☐ PAY BY FINDER NO.     FROM [    ]          TO [    ]
534 — ☐ INVOICE SEARCH                          ☐ INCLUDE CLOSED
      ☐ OTHER SEARCH
                                           [          ] PO/RN/BL/RP/CN [PO ▽]

[ SELECT (F1) ] [ UPD MICR (4) ] [ UPD CASH (5) ] [ NEXT CHEQUE (F9) ]

[ VARIANCE (u) ]     [ END (F3) ]

FIG. 12

FILE EDIT VIEW GO FAVORITES HELP
BACK FORWARD STOP REFRESH HOME SEARCH FAVORITES PRINT FONT MAIL

CASH APPLICATION CREDIT INQUIRY ARC MAINTENANCE ADMINISTRATION BULLETIN LOG IN/OUT HELP

399    CUSTOMER CORPORATE RELATIONSHIP MAINTENANCE    03/10/2000

544 —— SUBSIDIARY
     CUSTOMER NO.
     CUSTOMER NAME
     DEFINER
     ADDRESS

600 —— PAYOR
     CUSTOMER NO.
     CUSTOMER NAME
     DEFINER
     ADDRESS

[ OK (F1) ]   [ APPLY (F6) ]   [ DELETE (F11) ]   [ END (F3) ]

FIG. 13

```
┌─────────────────────────────────────────────────────────────┐
│ FILE EDIT VIEW GO FAVORITES HELP                            │
│ ← →   ⊗    ⟳     ⌂     ⊙      ☆       ⎙    A▽   ✉           │
│ BACK FORWARD STOP REFRESH HOME SEARCH FAVORITES PRINT FONT MAIL │
├─────────────────────────────────────────────────────────────┤
│ CASH APPLICATION CREDIT INQUIRY ARC MAINTENANCE ADMINISTRATION BULLETIN LOG IN/OUT HELP │
│                                                             │
│ 412       REVERSE ZERO APPLICATION        03/10/2000        │
│                      ┌────────┐ 640                         │
│ CUSTOMER NO          └────────┘                             │
│                      ┌────────┐ 642                         │
│ FINDER NO            └────────┘                             │
│                      ┌────────┐                             │
│ INVOICE NO           └────────┘    PO #                     │
│ INVOICE                            CURRENCY                 │
│ TRANSLATED                         INVOICE DATE             │
│ APPLIED AMOUNT                     CURRENCY                 │
│ TRANSLATED                         APPLIED DATE             │
│                                                             │
│ ┌───────┐  ┌──────────────────┐ ┌────────────┐ ┌──────────┐ ┌────────┐ │
│ │OK (F1)│  │APPLY/REVERSE (0) │ │NEXT INV (1)│ │CLEAR (F2)│ │END (F3)│ │
│ └───────┘  └──────────────────┘ └────────────┘ └──────────┘ └────────┘ │
└─────────────────────────────────────────────────────────────┘
         │
        644

FIG. 15
```

```
FILE EDIT VIEW GO FAVORITES HELP
  ⇐    ⇒    ⊗      ▯     ⌂     ⊕            ▭▽  🖨  A▽ ✉▽  ▭
BACK FORWARD  STOP REFRESH HOME  SEARCH  FAVORITES PRINT FONT MAIL  EDIT
CASH APPLICATION  CREDIT INQUIRY  ARC MENU  MAINTENANCE  ADMINISTRATION BULLETIN LOG IN/OUT HELP
```

452           CREDIT INTERCHANGE – DUN & BRADSTREET    2/29/2000

CUST NO  [2674661]

NAME
ADDRESS
                — 766

RISK  3
DUNS NO

TELEPHONE  780 930 6000
OPENED  11/01/1989  CR GUIDE   7,000,000  07/17/1995  RAW CR GUIDE          500,000 02/10/2000
C&C NO  SB50      ORD CONT    100,000 03/12/1998  LAST UPDATE  02/10/2000

HISTORY     N/A      HIGH CRED   4,249,999 RATING            CUR  –       07/20/1995
BUS STRUCT  N/A      AVG HIGH      70,355                    PR1         / /
YEAR STARTED 1971    SALES         N/A                       PR2         / /
EMPLOYEES  3200    NWORTH        N/A PAYDEX                CUR  65     07/20/1995
                        / /                                   PR1         / /
EXPERIENCE 619     SUITS      0      0                     PR2         / /
NEG. PAYMENTS  1     LIENS      0      0 STABILITY           CUR  4.50   02/10/2000
SLOW PAYMENTS 359    JUDGMENTS  0      0                     PR1  3.10   05/05/1998
O.K. PAYMENTS 259    OUT OF BUSINESS  N                      PR2  4.50   06/02/1997
                                              RAW SCORE  CUR  8.25   02/10/2000
                                                         PR1  3.07   07/06/1998
                                                         PR2  2.57   02/02/1997

SIC  5712  RETAILS–FURNITURE

| OK (F1) | NEXT (F9) | RETURN (F12) | RTO (0) | END (F3) |

| CLEAR (F2) | CUST CHG (n) | FINSUMM (5) |

FIG. 17

```
FILE EDIT VIEW GO FAVORITES HELP
  ←    →    ⊗    □    ⌂    ⊙        □▽   ⎙   A▽ ▽   □
 BACK FORWARD STOP REFRESH HOME SEARCH FAVORITES PRINT FONT MAIL EDIT
CASH APPLICATION  CREDIT INQUIRY  ARC MENU  MAINTENANCE  ADMINISTRATION  BULLETIN  LOG IN/OUT  HELP
```

328 CUSTOMER INQUIRY        ALL I.C.    LATEST AGING  03/01/2000

768 — CUSTOMER NO., NAME & ADDR.  [2620197] — 772
    MISC ONTARIO              \— 770

DO NOT MAIL                                                    ,— 774
    MAILDROP C40-W.HYLAND
    MISSISSAUGA ON L5N 5P9                           TEL 905-858-6554
                                     ,— 798           FAX
796
 \— PARENT NO.          CURRENCY $CDN        PAYOR NO.
    C&C# SB41
    C&C NAME  WAYNE HYLAND     800                              788

776  CLASS  9500      CASUAL MISC    CUST OPENED DATE  12/01/1989
  \— D&B RATING         / /          LAST REV DATE     02/21/1999
     RISK         N    RISK NOT AVAIL. LAST DUNNED DATE   / /
778  SECURITY                   0  0  LATEST AGEING DT  02/26/2000
     CR GUIDE      / /          0  0  NUM OPEN INVOICES      64
780  ORD CTRL                          NUM MEMO INVOICES       0
     HIGH CR  08/31/1999    88193  0  STATUS HO HOLD ALL ORDERS 12/17/1994
782 —LAST SALE  02/28/2000    701  0        NC NO CREDIT      / /
     LAST CH.   02/29/2000    335  0
     YTD SALES              166062    CUST BALANCE    790 — 17394  0
784  OPEN BAL. 02/05/2000    20080  0 CUST NOT DUE              4408
     PROMISE    / /              0  0 CUST CURRENT    792 — 5003
     AR CLAIMS                   0    CUST PAST DUE   794 — 5204
    —UNSHIPPED ORDERS         25484  0 UNAGED CREDITS             0
786                                   TOTAL INVESTM'T       14616

[OK (F1)] [INQ ENT (2)] [DET AGE (g)] [CUST CHG (■)] [STATEMENT (e)] [PAY HIST (y)]

[UNSHP ORD (3)] [INV SEL (i)] [P/S TOT (2)] [CRED INT (u)] [CLEAR (F2)] [CHG HIST (1)]

[RETURN (F12)] [POST DT (9)] [RTO (0)] [END (F3)]

FIG. 18

```
FILE EDIT VIEW GO FAVORITES HELP
```
```
  ←      →     ⊗     □     ⌂     ⊕        □▽    ⎙   A▽  ✉▽    □
BACK FORWARD  STOP REFRESH HOME SEARCH  FAVORITES PRINT FONT MAIL  EDIT
```
CASH APPLICATION  CREDIT INQUIRY  ARC MENU  MAINTENANCE  ADMINISTRATION  BULLETIN  LOG IN/OUT  HELP

330          CUSTOMER DETAIL AGEING AND NOTES         03/01/2000
                     ALL I.C. LATEST AGEING

CUSTOMER NO., NAME & ADDR.   2620197    MISC ONTARIO ⎯⎯ 802
                                        DO NOT MAIL
MAILDROP C40 W.HYLAND                   MISSISSAUGA, ON L5N 5P9
                          TEL 905-858-6554   FAX

C&C/   SB41    C&C NAME  WAYNE HYLAND                           ⎬ 804
PARENT NO.     0          CURRENCY  $CDN         LAST CHEQUE
CUST BALANCE   17395   STATUS HO  HOLD ALL ORDERS 12/17/1994  02/29/2000
CUST NOT DUE   4408              NC  NO CREDIT    / /         -336
CUST CURRENT   5004
CUST PAST DUE  5204    LAST CONTACT DATE  / /    ☐ TEL ☐ LETTER
       1-30    4845    PROMISE PAY DT     / /         ☐ VISIT
       31-60   13
806 ⎨  61-90   224     FOLLOW UP DATE     / /    AMOUNT [     00] [0]
       91-180  -299
       181-365 422
       +365    0       ┌─────────────────────────────────────┐
                       │12/18/1999 ABDILLA-RE F7444 CUST CALLED TO│
UNAGED CREDIT  0       │OVER PD ON LAST ORDER WILL DEDUCT FROM│
TOTAL INVESTMT 14616   │NEXT ORDER                           │
LATEST AGEING DT 02/26/2000 │10/05/1998 CAPRARA-RE F/6952 C/F TO│  ⎬ 744
                       │ANDREA VARD                          │
                       │07/27/1998 HYLAND-CRS COLLECTED $122.03│
                       │FROM D.KREKLEWETZ, W/O               │
                       └─────────────────────────────────────┘

[OK (F1)]  [SAVE (F4)]  [INV SEL (i)]  [UNSHP ORD (3)]  [PAY HIST (y)]

[SCR PD (6)]  [ADD TO SP (F6)]  [P/S TOT (2)]  [RTO (0)]  [RETURN (F12)]

[CLEAR (F2)]  [END (F3)]

FIG. 19

ON-LINE DETAILED REPORTING

```
FILE EDIT VIEW GO FAVORITES HELP
 ←   →   ⊗     □     ⌂     ⊙        □▽    🖨   A▽ 🗀▽  □
BACK FORWARD STOP REFRESH HOME SEARCH FAVORITES PRINT FONT MAIL EDIT
CASH APPLICATION CREDIT INQUIRY ARC MENU MAINTENANCE ADMINISTRATION BULLETIN LOG IN/OUT HELP
```

333            PAYMENT HISTORY       03/01/2000
                   └────── 810 ──────┘

CUSTOMER NO., NAME, ADDR.  [2620197]  MISC ONTARIO ────── 802
                                      DO NOT MAIL
MAILDROP C40 W.HYLAND                 MISSISSAUGA ON L5N 5P9

|  | CURRENT SEMESTER (830) | | LAST SIX MONTHS (834) | | PRIOR SIX MONTHS (840) | |
|---|---|---|---|---|---|---|
| NET SALES (812) | | 167011 | | 591078 | | 457021 |
| CREDIT NOTES | | 6843 | | 36580 | | 9214 |
| AV DAY EARLY SLOW (814) | 27 | 0 | 20 | 3 | 25 | 2 |
| AV TERMS DTP VARI | 34 | 9 24 | 32 | 13 18 | 32 | 13 19 |
| % C/D-PT-SLOW | 0 | 100 0 | 0 | 88 11 | 0 | 97 2 |
| C/D ALLOWED | | 0 | | 0 | | 0 |
| C/D CHARGED BACK | | 0 | | 0 | | 0 |
| C/D COLLECTED | | 0 | | 0 | | 0 |
| ARC # AMOUNT | 0 | 0 | 2 | 383 | | 0 |
| INT CHARGED | | 0 | | 0 | | 0 |
| INT COLLECTED | | 0 | | 0 | | 0 |
| INT CANCELLED (816) | | 0 | | 0 | | 0 |
| HIGH CREDIT | | 75540 | | 148120 | | 138348 |
| W/O # AMOUNT (820) | 9 | 3574 | 60 | 50068 | 84 | 303 |
| N.S.F. CHEQUES (824) | 0 | 0 | 0 | 0 | 0 | 0 |

[OK (F1)]  [CLEAR (F2)]  [RETURN (F11)]  [END (F3)]

[INV SEL (i)]  [CUST INQ (q)]  [RETURN TO THE CALLING SCREEN]

[CUST CHG (m)]

FILE EDIT VIEW GO FAVORITES HELP

BACK FORWARD STOP REFRESH HOME SEARCH FAVORITES PRINT FONT MAIL EDIT

CASH APPLICATION  CREDIT INQUIRY  ARC MENU  MAINTENANCE  ADMINISTRATION  BULLETIN  LOG IN/OUT  HELP

421    OUTSTANDING ARCS SUMMARY    03/01/2000

RESP ID  [ WFAGAN ] — 892

894

|        | TOTAL     | CURRENT   | 2 MONTHS | 3 MONTHS | 4-6 MONTHS | 7-12 MONTHS | OVER 1 YEAR |
|--------|-----------|-----------|----------|----------|------------|-------------|-------------|
| AMOUNT | 72,452.92 | 34,572.63 | 1,119.60 | 4,954.23 | 31,806.66  | 0.00        | 0.00        |
| NO.    | 22        | 9         | 2        | 3        | 8          | 0           | 0           |

[ OK (F1) ] [ SUBTC SUNN (x) ] [ RETURN (F12) ] [ CLEAR (F2) ] [ END (F3) ]

422    OUTSTANDING ARC SUBTRANSACTION SUMMARY    03/01/2000

RESP ID  [ WFAGAN ]

| SUBTRANSACTION | NUMBER | AMOUNT |
|---|---|---|
| SC SALES CONCESSION | 10 | 2876.21 |
| BH INVOICE NOT AS PER CONTRACT | 3 | 10566.25 |
| DO OPER'N/SERVICE REL'D TO OTHER REASON | 4 | 23013.94 |
| SP SALES PROMOTION | 4 | 9769.38 |
| PA PRICING ERROR | 1 | 338.25 |

896

[ OK (F1) ] [ SUMMARY PAGE (y) ] [ RETURN (F12) ] [ CLEAR (F2) ] [ END (F3) ]

FIG. 22

WEB-BASED METHOD AND SYSTEM FOR MANAGING ACCOUNT RECEIVABLES

BACKGROUND OF THE INVENTION

This invention relates generally to a web-enabled Accounts Receivable System (ARS) and more particularly to methods and apparatus for managing various functions related to accounts receivables, credit granting, collection, dispute management and reporting and remittance processing.

The accounting department of a business entity expends substantial resources managing account receivables. An accounts receivable function includes the tasks of credit inquiries, approving credit to new and existing customers, and analyzing payment history of existing customers. In addition to credit approvals, aging of the receivables, disputes and delinquencies, collections and proper application of the payments, and determining appropriate write-offs and appropriate reporting capabilities, also must be managed. These tasks are time-consuming and often take away resources of the corporation from its operations and other profitable activities. Completing several of these tasks also typically requires interfacing with outside agencies for credit approval and constant updates to the customer records.

BRIEF SUMMARY OF THE INVENTION

In an exemplary embodiment of the invention, a web-enabled Accounts Receivable System (ARS) provides a full range of trade receivables Credit & Collection services including credit evaluation, credit granting, customer collection and account reconciliation, remittance processing, application and banking, all account receivables (A/R) reporting, consolidation, including customer statement preparation and mailing, ending with direct feeds to a client's general ledger system (G/L) for the client's financial statement preparation. The system serves clients by allowing them to outsource their full accounts receivable (A/R) function while still retaining the important computer-to-computer links covering order shipping approvals (after credit evaluation), billing/invoice feeds, customer dispute monitoring and reporting (on-line), and final month-end G/L interface for receivables balancing.

The system includes five modules: which include a Credit Inquiry Module, a Remittance Processing Module, an Accounts Receivable Claim Module, a Maintenance Module, and an Administration Module. These modules are integrated with each other and are capable of interfacing with a client's Order, Ship, Bill (OSB) system for smooth functioning. The ARS is further capable of automatically upgrading the software and systems templates to the client by downloading on a real-time basis as they are being implemented at a central site and as called for by a user.

In one embodiment of the invention, the ARS's web-based features encompass all areas of fund's movement for a complete back office solution. The ARS produces a variety of reports on-line and downloads as soon as they are generated in the ARS. The reports are generated in a flexible output format, as per the user's request, like Microsoft Word, Excel or plain text format for importing into any database. The ARS's audit module monitors the user's activities like successful and failed logins, timestamps, password changing, and remote ID. The Administrative Module is available for power users, allowing them to manage their own area of business reports, including creating new users, adding new report entries or assigning reports to users. The system takes credit card information from the customer's OSB or through the ARS web site and transfers it electronically into the ARS' cash module where invoices are off-setted automatically.

BRIEF DESCRIPTION OF THE DRAWINGS

FIG. 8 is an exemplary screen layout of the Accounts Receivable System shown in FIG. 3;

FIG. 12 is an exemplary embodiment of a screen layout of the ARS shown in FIG. 3, which displays a payment application to a customer account;

FIG. 13 is an exemplary embodiment of a screen layout of the ARS shown in FIG. 3, which displays the creation of a parent heirarchy record or payor heirarchy record for the subsidiary customer;

FIG. 15 is an exemplary embodiment of a screen layout of the ARS shown in FIG. 3, which displays the reversal of a zero application and all other records;

FIG. 17 is an exemplary screen layout of the Accounts Receivable System shown in FIG. 3, which displays customer interchange credit;

FIG. 18 is an exemplary screen layout of the ARS shown in FIG. 3, which displays customer information sorted by customer number;

FIG. 19 is an exemplary screen layout of the ARS shown in FIG. 3, which displays the detail aging of a given customer along with scratch pad notes;

FIG. 20 is an exemplary screen layout of the ARS shown in FIG. 3, which displays the payment history of a given customer;

FIG. 22 is an exemplary screen layout of the ARS shown in FIG. 3, which displays the root cause analysis summarizing outstanding Accounts Receivable Claims.

DETAILED DESCRIPTION OF THE INVENTION

Exemplary embodiments of systems and processes that facilitate integrated Internet-based accounts receivables process management are described below in detail. The systems and processes facilitate, for example, electronic submission of information using a client system, automated transmission of information, and web-enabled monitoring and reporting and management of account receivables including a final month end general ledger interface for receivable balancing for client's users.

The systems and processes are not limited to the specific embodiments described herein. In addition, components of each system and each process can be practiced independent and separate from other components and processes described herein. Each component and process can be used in combination with other components and processes.

Figure 1:
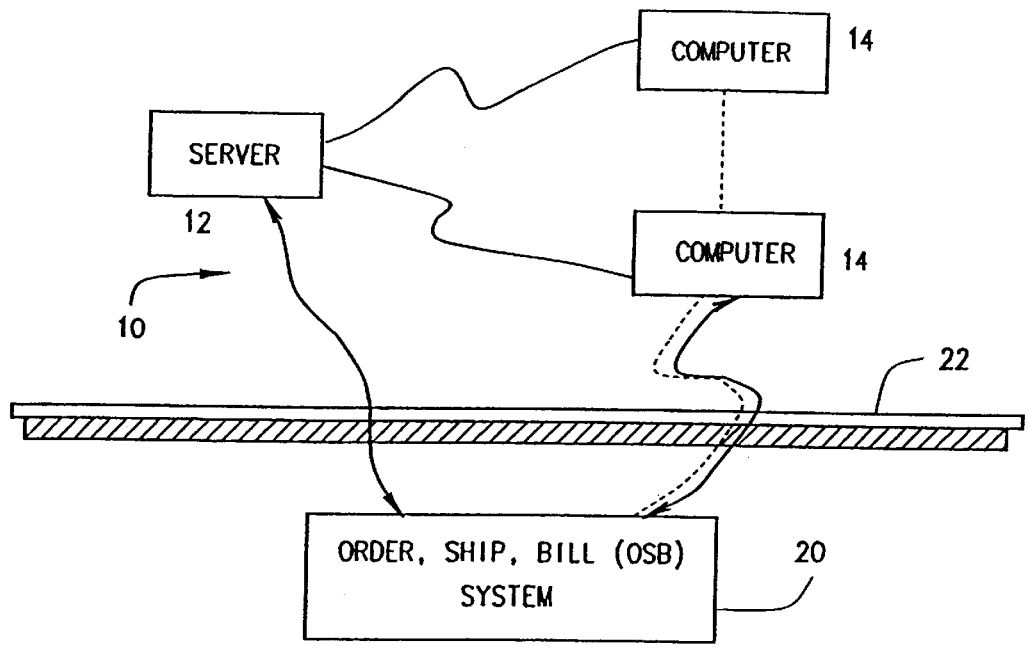
FIG. 1 is a block diagram of an Accounts Receivable System including a server system and a plurality of devices.
Figure 3:
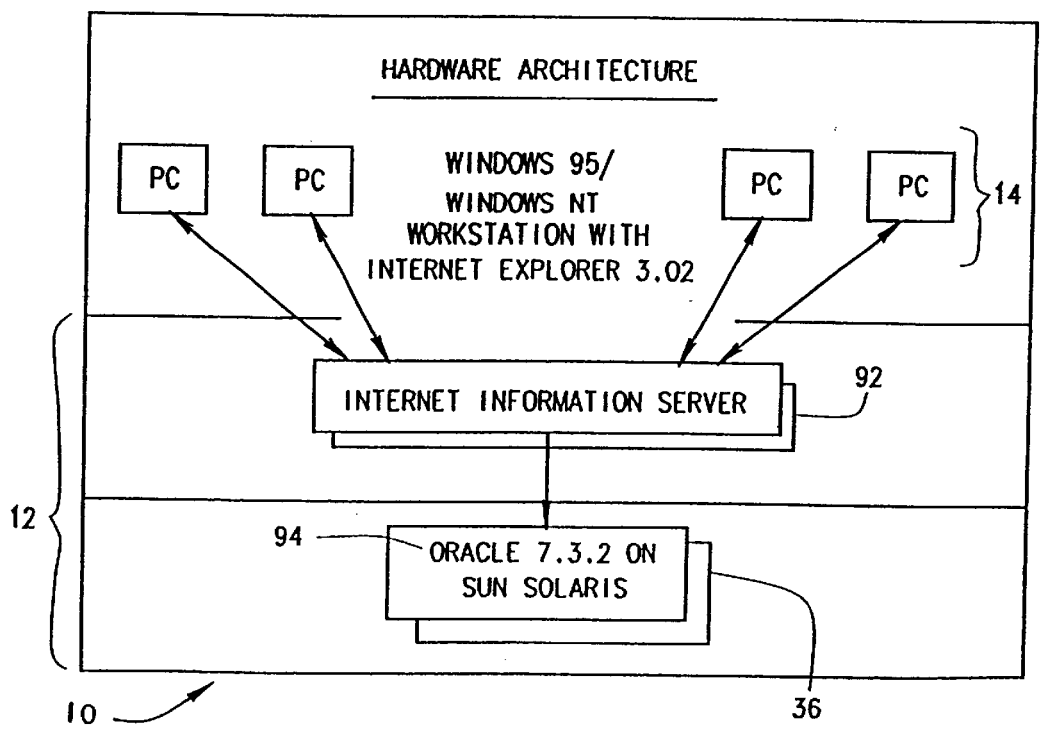
FIG. 3 is an example embodiment illustrating further additional detail of an Accounts Receivable System.
Figure 2:
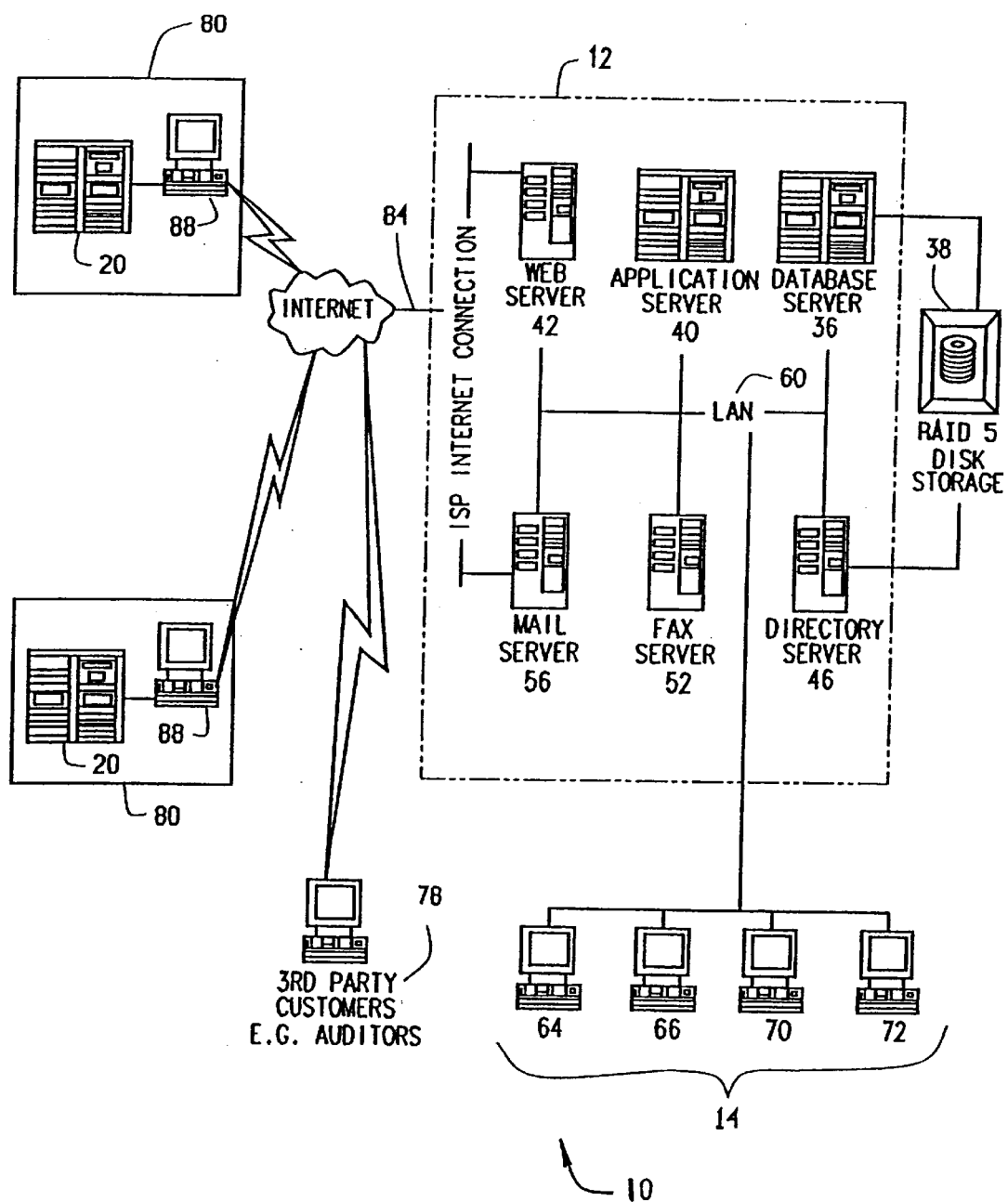
FIG. 2 is an expanded version block diagram of an example embodiment of an Accounts Receivable System.

FIG. 1 is a simplified block diagram of an Accounts Receivable System (ARS) 16 including a server system 12 and a plurality of devices 14 connected to server system 12. FIG. 2 is an example embodiment illustrating additional detail of ARS 10. FIG. 3 is an example embodiment illustrating further additional detail of ARS 10. In one example embodiment, devices 14 are computers including a web browser, and server system 12 is accessible to devices 14 via the Internet. Devices 14 are interconnected to the Internet through many interfaces including a network, such as a local area network (LAN) or a wide area network (WAN), dial-in-connections, cable modems and special high-speed ISDN lines. Devices 14 could be any device capable of interconnecting to the Internet including a web-enabled phone or other web-enabled connectable equipment. Device 14 is capable of connecting directly to Order, Ship, Bill (OSB) System 20 located at the client site. Server system 12 is also capable of communicating with OSB system 20 either through a direct link or through one of devices 14 located at the client site and upload and download the data as required. Accounts Receivable System 10 is installed at a business entity site within a firewall 22 while OSB system 20 is located at client site outside firewall 22 of the business entity. Both systems are configured to download and upload required data through a secure connection for performing the required functions.

As shown in FIG. 2, system 10 includes a server system 12 and devices 14. Server system 12 also includes a database server 36 including a data storage device 38, an application server 40, a web server 42, a directory server 46, a fax server 52 and a mail server 56. A disk storage unit 38 is coupled to database server 36 and director server 46. Servers 36, 40, 42, 46, 50, 52, and 56 are coupled in a local area network (LAN) 60. In addition, device 14 includes a system administrator work station 64, a customer service representative work station 66, a credit officer's work station 70, and a general function work station 72. Work station 72 is utilized by someone having an authorized access to maintain and update ARS 10. Work stations 64, 66, 70, and 72 are connected to LAN 60. Alternatively, workstations 64, 66, 70, and 72 are coupled to LAN 60 via an Internet link or connected through an Intranet.

Each work station 64, 66, 70 and 72, in the exemplary embodiment, is a personal computer including a web browser. Work stations 64, 66, 70 and 72, are illustrated as being associated with separate functions only to facilitate an understanding of the different types of functions that can be performed by individuals having access to LAN 60.

In an alternate embodiment, server system 12 is configured to be communicatively coupled to third parties, e.g., internal or external auditors 78, and to various clients 80 located outside firewall 22, via an Internet Service Provider (ISP) Internet connection 84. The communication in the exemplary embodiment is illustrated as being performed via the Internet, however, any other wide area network (WAN) 86 type communication can be utilized, i.e., the systems and processes are not limited to being practiced via the Internet. In addition, and rather than a WAN, a local area network could be used in place of the WAN.

Each outside client 80 is connected to their own OSB system 20. Outside client 80 also has a work station 88, which is a personal computer including a web browser. Also, Work stations 88 are configured to communicate with server system 12. Furthermore, fax server 52 communicates with outside clients 80 and any of the remotely located overseas clients including a device (not shown) via a telephone link. Fax server 52 communicates with other devices 64, 66, 70 and 72, as well. Accounts Receivable System 10 is installed at a business entity site while OSB system 20 is located at the client site. Both systems 20, and 10 are configured to download and upload required data through a secure connection, from each other, for performing the required functions. Continuous enhancements ensure compatibility to use new technology as it becomes available which ultimately reduce cost and improve efficiency.

As shown in FIG. 3, device 14 is a desktop (thin device or often referred as thin client). Thin devices, as used herein, are Intel compatible PCs with Pentium or higher processors and a minimum 36 MB RAM running Windows 95 or Windows NT 4.0 workstations and Internet Explorer 4.0 and above. Server system 12 includes an application server 40 with a Pentium processor and a minimum 64 MB RAM running Windows NT 4.0 server and an Internet Information Server 92. The Business logic will reside in this layer in the form of Dynamic Link Libraries (DLL). An Oracle 7.3.2 database 94 on UNIX is used as a Database server 36, which is part of server system 12. Database server 36 is a server including a Pentium processor and a minimum 64 MB RAM running Sun Solaris. The database layer resides within database server 36. Centralized database 94 containing a variety of information relating to clients and their customers, as described below in greater detail, is stored on database server 36 of server system 12 and can be accessed by potential users at one of devices 14 by logging onto server system 12 through one of devices 14. Stored procedures are used to access database 94. All database interactions are done through Active X DLL's. Devices 14 are internally connected to OSB System 20 located at the client site. Server system 12 communicates with OSB system 20 either through a direct link or through one of the devices 14 located at the client site to upload and download the data as required.

Figure 4:
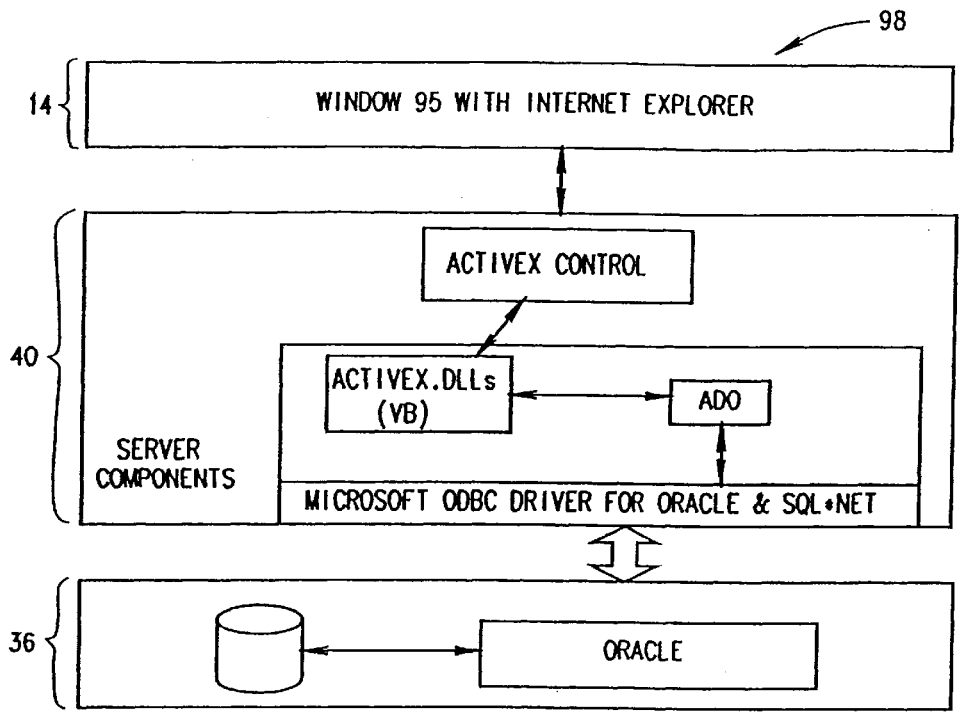
FIG. 4 is an exemplary embodiment of a software architecture for the Accounts Receivable System shown in FIG. 3.

FIG. 4 is an exemplary embodiment of the software architecture 98 of ARS 10, database server 36 and application server 40 of Server system 12. The Software Architecture used in ARS system 10 has a Web Browser such as IE 4.0 and above as the front end. The Web Browser downloads the ActiveX controls developed in VB5.0, which forms the User Interface.

Middleware in ARS 10 implements the business rules and database calls and resides on the NT application server. The middleware is in the form of ActiveX objects (DLLs). Middleware is a software that connects two otherwise separate applications. For example, there are a number of middleware products that link a database system to a Web server. This allows users to request data from the database using forms displayed on a Web browser, and it enables the Web server to return dynamic Web pages based on the user's requests and profile. Middleware retrieves data from Oracle database 94 residing on the UNIX server. IIS is used as the WebServer. Active Database Objects (ADO) are used for database access. Oracle 7.3.2 database 94 resides on the UNIX Server.

Security in ARS 10 is closely monitored because of confidential and proprietary client information. Security is maintained in the system by providing various authority access levels. These access levels exist for individuals with different authorities such as Headquarter authority, supervisor authority, credit evaluator authority, Collector authority and remittance processing authority. When the user logs onto the application, the user's authority is checked, and depending upon the user's authority the user is given access to select screens.

Apart from the above security, ARS 10 also maintains regular security that is normally involved in every Intranet application. In every Active Server page ARS 10 checks whether the user has logged in and if the user has logged in then system 10 also checks whether the user has come for the right Active Server Page from which the user is supposed to access. If none of the above criteria is satisfied then system 10 displays an error message "Invalid Access to Screen". Also there is a session variable that checks if the logged on user is idle for more than a predetermined period of time and if so the user is automatically logged out of the application with the following replacement paragraph.

Figure 5:
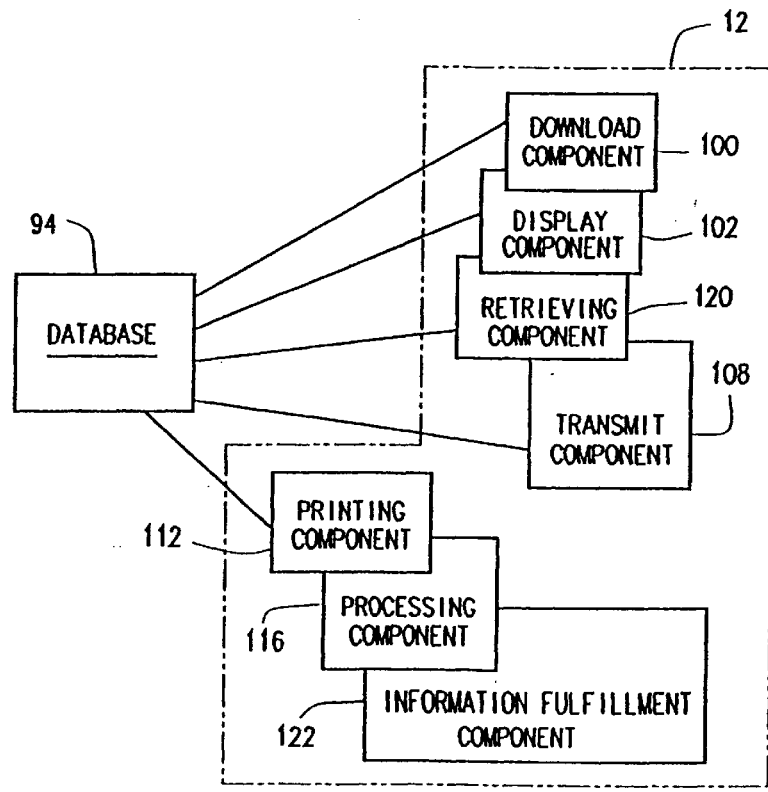
FIG. 5 is a database structure within a database server of the Accounts Receivable System shown in FIG. 3.

FIG. 5 is database 94 structure within database server 36. Database 94 is coupled to several separate components within server system 12, which perform specific tasks. ARS 10 manages full range of trade receivables credit and collection services involving credit evaluation credit granting, customer collection and account reconciliation, remittance receipt, application processing, banking, receivables consolidation, and updating OSB general ledger. ARS 10 receives the pertinent information from client's OSB system 20 for processing and generating required journal entries with a variety of reports for financial monitoring, reporting and auditing purposes. The information retrieved and processed is stored in centralized database 94 for permanent as well as temporary access.

For example, server system 12 is divided into separate components such as, a download component 100 for downloading journal entries and a variety of reports, a display component 102 for displaying the journal entries and the variety of reports, a transmit component 108 for transmitting required information to the OSB system, and a printing component 112 for printing journal entries and the variety of reports downloaded and displayed by the respective server components. The system accepts commands from device 14, e.g., by utilizing a peripheral to make a selection or by utilizing a voice command. Server system 12 includes a processing component 116 for searching and processing received requests against data storage device 38. Furthermore, server system 12 also includes a retrieving component 120 to retrieve information from data storage device 38. An information fulfillment component 122 downloads the requested information after retrieving from data storage device 38 to the plurality of devices.

The architectures of systems 10 as well as various components of system 10 are exemplary only. Other architectures are possible and can be utilized in connection with practicing the processes described below.

FIGS. 6 through 23 illustrate the operational flow of ARS 10 including the interrelationship among various ARS 10 modules and the interface between ARS 10 and OSB 20.

Figure 6:
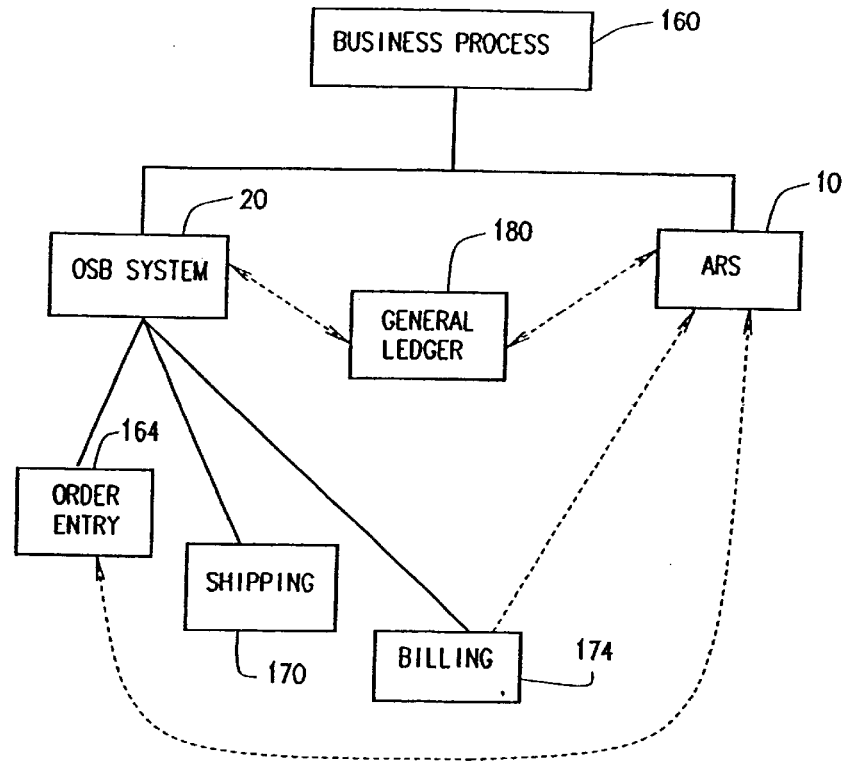
FIG. 6 depicts the functions of an Order, Ship, Bill (OSB) System and an Accounts Receivable System with reference to a business process.

FIG. 6 depicts the functions of OSB System 20 and ARS 10, with reference to a business process 160. OSB System 20 includes an Order Entry function 164, a Shipping function 170 and a Billing function 174. ARS 10 includes the remaining functions involved with accounts receivables of business process 160 including managing customer credits, receiving and processing payments against open invoices, balancing general ledger on a periodic basis, financial statement data generation for accounting and internal controls and preparing periodic reports to meet generally accepted accounting principles (GAAP) and Financial Accounting Standards Board (FASB) requirements. Clients 80 from their individual locations operate OSB system 20 and a General Ledger (G/L) system 180. ARS 10 is operated at a remote location by a business entity, which has a group of professionals specializing in ARS 10. In an alternative embodiment, ARS 10 is operated and managed at the clients' locations by the clients' own staff with training and system enhancements being performed by ARS 10 staff.

Figure 7:
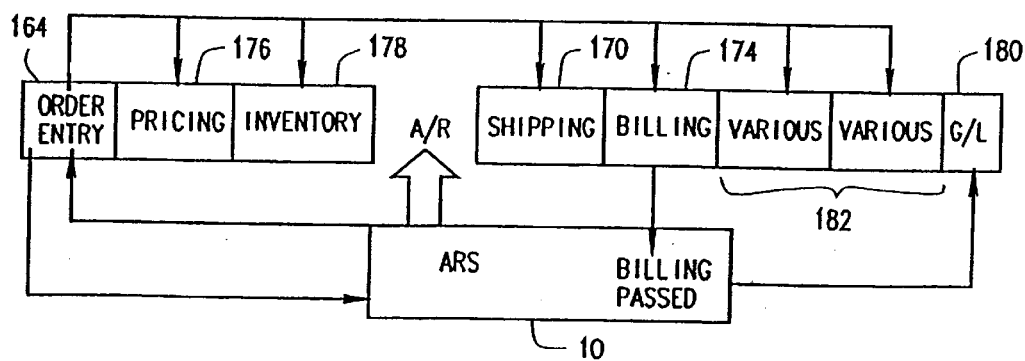
FIG. 7 depicts the functional relationship of the Accounts Receivable System integrated directly into a client's OSB system and general ledger (G/L) system.

FIG. 7 shows how ARS 10 interfaces with a client OSB system 20 and general ledger (G/L) module 180 to provide continuity to the client. ARS 10 receives the data from, and transmits the data to, the different components of OSB system 20 such as Order Entry 164, Shipping 170, and Billing 174. Order Entry 164 processes the customer order by extracting data from Pricing component 176 and Inventory component 178. ARS 10 also interacts with various other components 182 of client system as required. The integrity of OSB system 20 is critical for proper functioning of ARS 10 since ARS 10 uses the data received from OSB 20 to generate the general ledger entries as well as other management reports. ARS 10 manages several other aspects of business process 160 to properly populate the general ledger with pertinent receivable data on a periodic basis including processes involved with credit management.

FIG. 8 is an exemplary screen layout of ARS 10. ARS 10 involves credit granting, collection, remittance processing, and reporting/administration. ARS functions are organized into five modules: a Credit Inquiry Module 190, a remittance processing Module 194, an Accounts Receivable Claim (ARC) Module 200, a Maintenance Module 204 and an Administration Module 210. Remittance Processing Module 194 is sometimes referred to as a Cash Application Module. Credit Inquiry Module 190 provides to the user extensive customer and receivable related information in a variety of ways. Remittance Processing Module 194 involves processing of remittance payments, delinquency management and payment-related functions. ARC Module 200 manages customer disputes. Maintenance Module 204 is used to maintain and store various types of customer information. Administration Module 210 is used to handle security and high-level systems functions.

There is a high level of integration across all the modules. Although a user may enter a function attached to a particular module in ARS 10, subsequent navigation takes the user back and forth across the different modules in ARS 10. For example, a user applying a check in Remittance Processing Module 194 accesses Credit Inquiry Module 190 to conduct a customer search or to display invoice details. A user viewing a customer statement accesses Maintenance Module 204 to modify customer information, or Remittance Processing Module 194 to offset debit and credits together under the account, or ARC Module 200 to set up or display a dispute. A user searching for an invoice in Credit Inquiry Module 190 or setting up a reference between two invoices in Maintenance Module 204 accesses Remittance Processing Module 194 to display a list of duplicate invoices. Similarly, a user reviewing billing batches in Administration Module 210 accesses Credit Inquiry Module 190 to display invoice details.

Overall, ARS 10 provides a full range of credit and collection services for trade receivables including credit evaluation, credit granting, customer collection and account reconciliation, payment receipt, application and banking, account receivables (A/R) reporting, consolidation, including customer statement preparation and mailing, ending with direct feeds to the client's general ledger (G/L) system 180 for financial statement preparation. ARS 10 can produce journal entries to update G/L system 180 by using pseudo account numbers internally which are mapped and transferred to client's G/L system 180 via a file transfer protocol (FTP). ARS 10 provides an option to clients 80 to outsource their full A/R function while still retaining the important computer-to-computer links with OSB system 20 covering order shipping approvals (after credit valuation), billing/invoice feeds, customer dispute monitoring and reporting (on-line), and final month-end G/L interface for receivables balancing. Each module of ARS 10 is described in detail.

A. Credit Inquiry Module

Credit Inquiry Module 190 primarily involves credit evaluation at the time the customer account is set up, and credit maintenance activities. Credit Inquiry Module 190 also interfaces with various modules to access delinquencies, collections and write-offs.

Credit Inquiry Module 190 reviews pay history and performs credit inquiries. Pay history is a set of calculations based on a payment period from invoice date to date of payment received. ARS 10 sorts all data and compiles it into a report that compares the data over an eighteen-month period and displays it in six-month increments. Credit Inquiry Module 190 accesses a customer account and views a diverse supply of data used for customer analysis, credit management, and customer contact. Credit Inquiry Module 190 further includes search options.

Credit Inquiry Module 190 predicts remittance forecasts for a specific customer or account based on historic data. ARS 10 predicts overall cash forecasting for the client. Credit Inquiry Module 190 further performs audit verification for tracking all transactions at the customer level for account reconciliation.

1. Credit Application Process [New Customer]

The client works with the business entity to establish approval criteria on new customer accounts and to choose client specific credit scoring options using scoring software programs contained in ARS 10.

Figure 9:
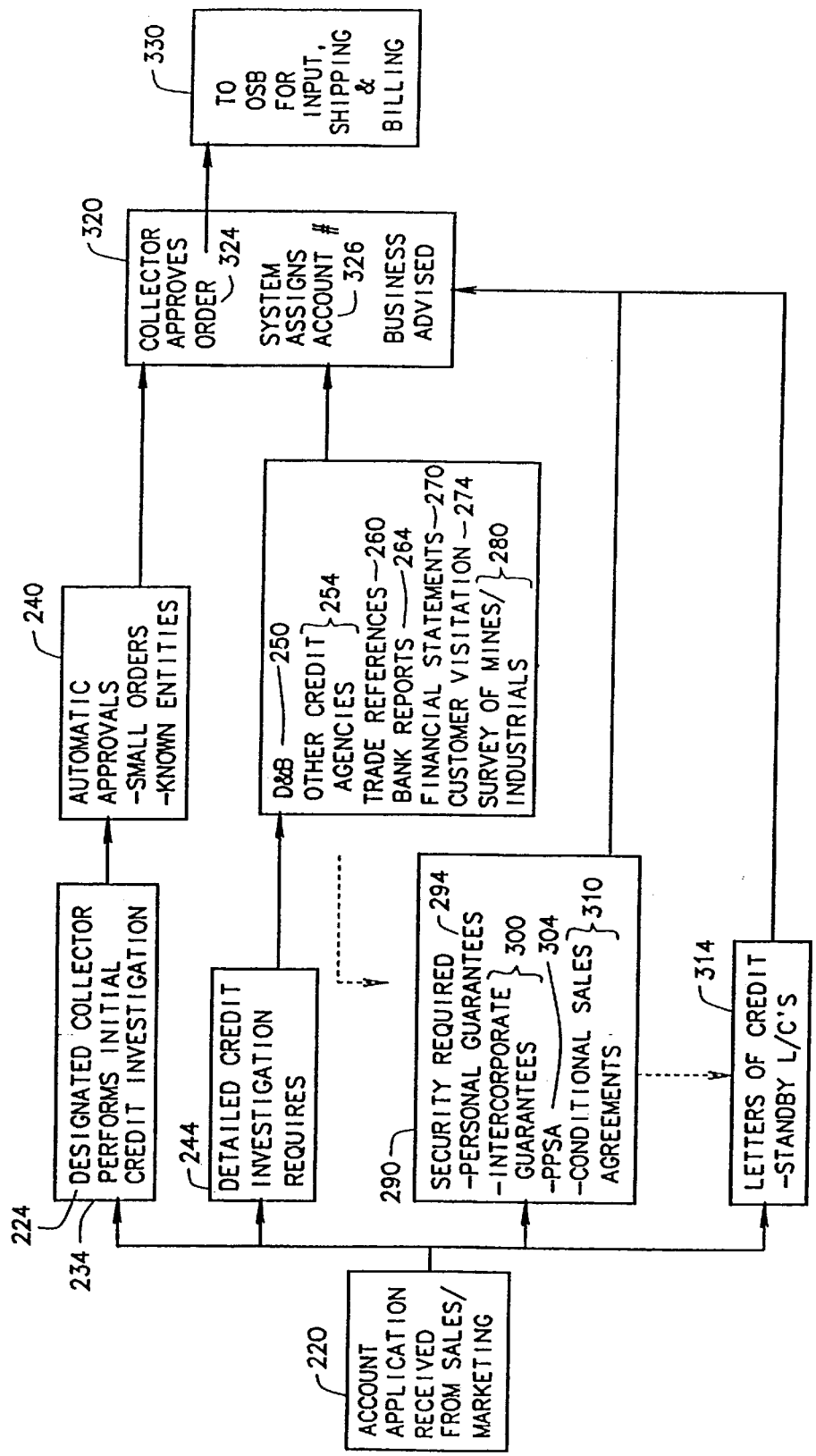
FIG. 9 is an activity diagram for performing a credit check through a Credit Inquiry Module of the ARS shown in FIG. 3.

FIG. 9 is an activity diagram for performing a credit check for an existing customer through Credit Inquiry Module 190 on a customer who has placed a purchase order through OSB system 20. Once the customer places a purchase order, ARS 10 receives a request for approval 220 on a new account. ARS 10 procedures routes request for approval 220 to a designated credit officer 224 out of a plurality of credit officers 230. Credit officers 230 are also sometimes referred to as collectors or collection representatives. Designated credit officer 224 performs an initial credit investigation 234 on request for approval 220 of the new account. Designated credit officer 224 automatically approves request for approval 220 if the order aggregates less than an amount specified by the client or if the order is from a specified known customer pre-designated by the client. If request for approval 220 is not automatically approved 240, designated credit officer 224 performs a detailed credit investigation 244.

Credit investigation 244 does not have a specified application; rather it involves a variety of tools such as Dun & Bradstreet reports 250 and/or other credit reporting agencies 254, trade references 260, bank reports 264, financial statements 270, customer visits 274, and survey of Mines and Industrials 280. ARS 10 electronically interfaces with Dun & Bradstreet or other credit reporting agencies for searching and identifying a customer by name, address and telephone number and obtaining Dun & Bradstreet reports 250 or other credit reporting agencies reports 254, thereby minimizing the time in the credit approval process.

Based on credit investigation 244, designated credit officer 224 determines whether credit should be granted to the customer. Each designated credit officer 224 has limits to the credit authority, which are resident and strictly controlled within ARS 10. Designated credit officer 224 cannot grant a credit line in excess of their delegated authority limits. ARS 10 restricts access for changing the credit limits of credit officers 230 only to specified authorized individuals within the business entity.

If the customer meets the pre-determined parameters of credit investigation 244 and if the credit is within the limits authorized to designated credit officer 224, designated credit officer 224 approves the new account request. If the customer does not meet the pre-determined parameters of credit investigation 244 or if the credit requested by the customer exceeds the authorized limits of designated credit officer 224, then ARS 10 personnel attempts to obtain security 290 such as personal guarantees 294, inter-corporate guarantees 300, PPSA 304 or conditional sales agreements 310. For approval of various orders, a letter of credit 314 may be sought.

Once designated credit officer 224 makes a decision 324 to approve the order, ARS 10 assigns an approval number in the case of an existing account or an account number 326 in the case of a new customer account to the order and interfaces with OSB system 20 which performs Order Entry function 164, Shipping function 170, and Billing function 174. An interface 330 completes the credit approval process.

2. Customer Order Approval-[Existing Customer]

Figure 10:
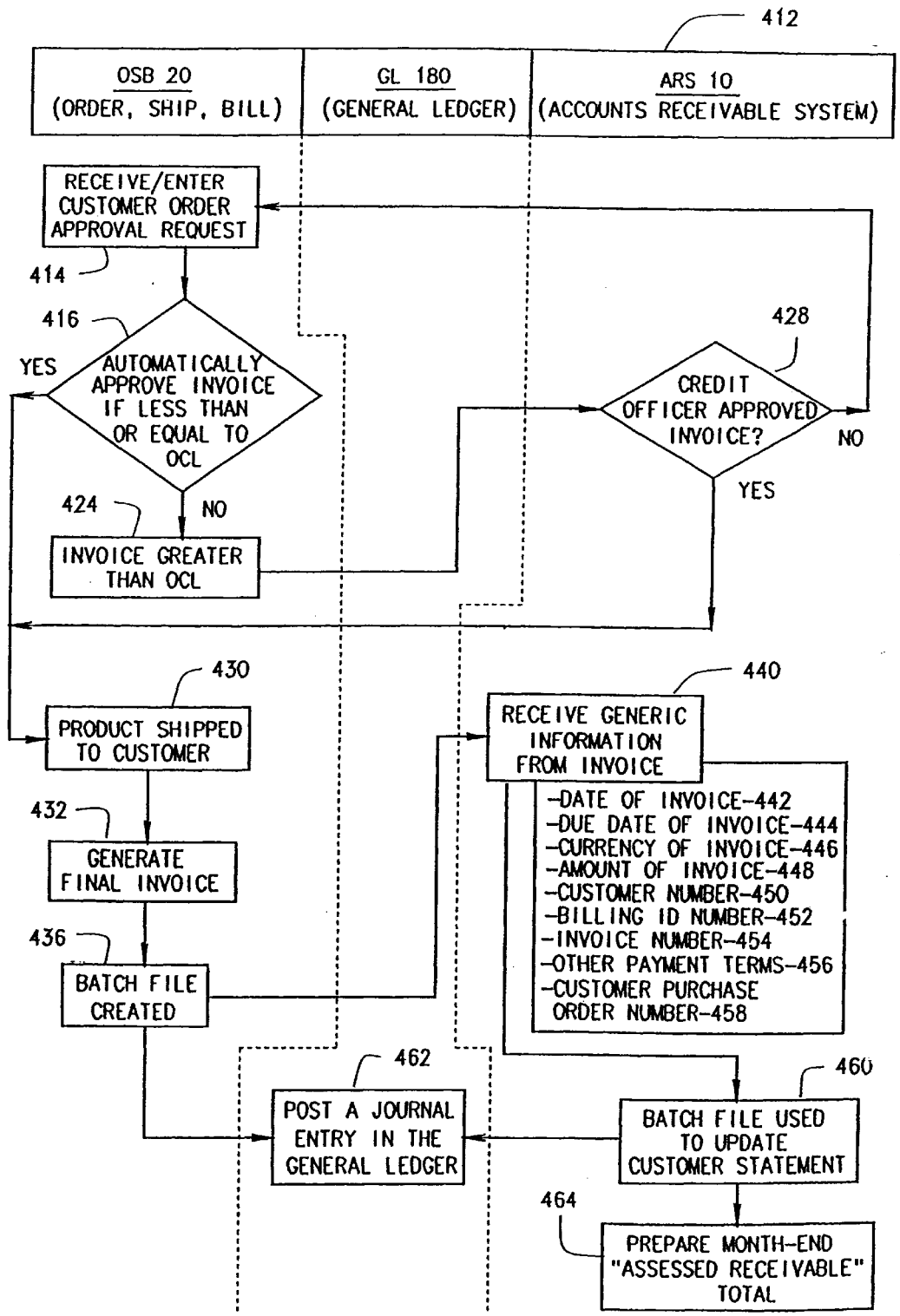
FIG. 10 is an activity diagram of the ARS shown in FIG. 3, for the invoice generation.

FIG. 10 is an activity diagram which depicts the process for customer order approval and invoice generation 412 as well as credit approval and posting of general ledger entries on G/L system 180. Activities are located in respective columns based on the system that performs the activity. The columns correspond to OSB system 20, G/L (General Ledger) System 180 and ARS 10.

OSB system 20 enters/receives a customer order approval request 414. OSB system 20 makes 416 a decision to automatically approve customer order 414 if the amount of order 414 is less than or equal to the Order Control Limit (OCL) 422. OCL 422 is initially established when the account is set up in ARS 10. After the initial set up, there are three ways in which the OCL 422 can be adjusted. Designated credit officer 224 can change the limit, or can place a Hold Order or a Credit Referral on the account. If a Hold Order or Credit Referral is placed on the account, OCL 422 is automatically reduced to zero. These changes to OCL 422 are fed to the client's OSB system 20 in a pre-determined cycle.

If the amount of approval request 414 exceeds 424 the OCL, approval request 414 is deferred and designated credit officer 224 is informed of the deferral through ARS 10. Designated credit officer 224 then makes 428 a decision to approve, decline or hold the approval request 414. Since the information is fed back and forth between OSB system 20 and ARS 10 in pre-determined cycles, the time lag for a decision is short with the vast majority being automatically and instantly approved within the client's OSB 20 based on ARS 10 pre-approvals. Once approved, OSB system 20 ships product 430 and generates a final invoice 432. The client's OSB system 20 manages pricing and stores this information together with customer discounting structures, etc., within OSB system 20 and subsequently generates a customer invoice (hard copy or electronic) for its customer. OSB system 20 also creates a batch file 436 and dispatches said batch file 436 to ARS 10 the same evening.

Batch file 436 includes basic information 440 pertaining to invoice 432. Information 440 received electronically to ARS 10 includes information such as a date of invoice 442, a due date of invoice 444, a currency of invoice 446, an amount of invoice 448, a customer number 450, a billing identification recognition code (IC) 452, an invoice number 454, other payment terms 456 and a customer purchase order number 458, if available.

ARS 10 then uses batch file 436 to update the customer's statement 460 for collection and monitoring purposes. ARS 10 also posts a journal entry 462 for balancing of the client's G/L system 180 at the month end. ARS 10 finally produces an "assessed receivable" total 464, which provides the client with the G/L interface numbers to balance its financial statement and outstanding receivables. As part of this function, ARS 10 produces aged trial balances, dispute reports, trending reports, and any other reports for use by the client in substantiating assessed receivable total 464.

B. Remittance Processing Module

Remittance Processing Module 194 involves application of remittance payments, aging the receivables. Remittance Processing Module 194 has several capabilities including accepting funds in any foreign currency and translating the funds into the required local currency for reporting purposes. In one embodiment, the reporting is conducted in local currency. In an alternative embodiment, the reporting is conducted in foreign currency. Exchange gain and loss calculations are automatically generated by Remittance Processing Module 194 of ARS 10. Remittance Processing Module 194, under certain conditions, automatically applies and updates a customer's account through a series of algorithms. Appropriate individuals, as designated, based on systems' security levels, have the authority to ZAP a particular account. ZAP is a derivative of remittance processing which allows for offsetting of items within a customer's account. In these situations, updating of balance is performed automatically online.

Remittance Processing Module 194 displays the accounts and applies the received cash by Payor Hierarchy. Payor Hierarchy allows the user to access multiple accounts through one or more designated main accounts. Remittance Processing Module 194 also allows Auto Draft and Reverse Application functions in conjunction with Maintenance Module 204. Auto Draft selects specific invoices in a customer's account to be paid, which are formatted into an electronic bank file for funds transfer. Through Reverse Application, ARS 10 reverses previously completed applications and associated general ledger entries on G/L system 180, and restores the account to the original balance on-line.

The following steps explain the operational and the functional flow involved in managing Remittance Processing Module 194.

1. Payment Receipts and Application

Figure 11:
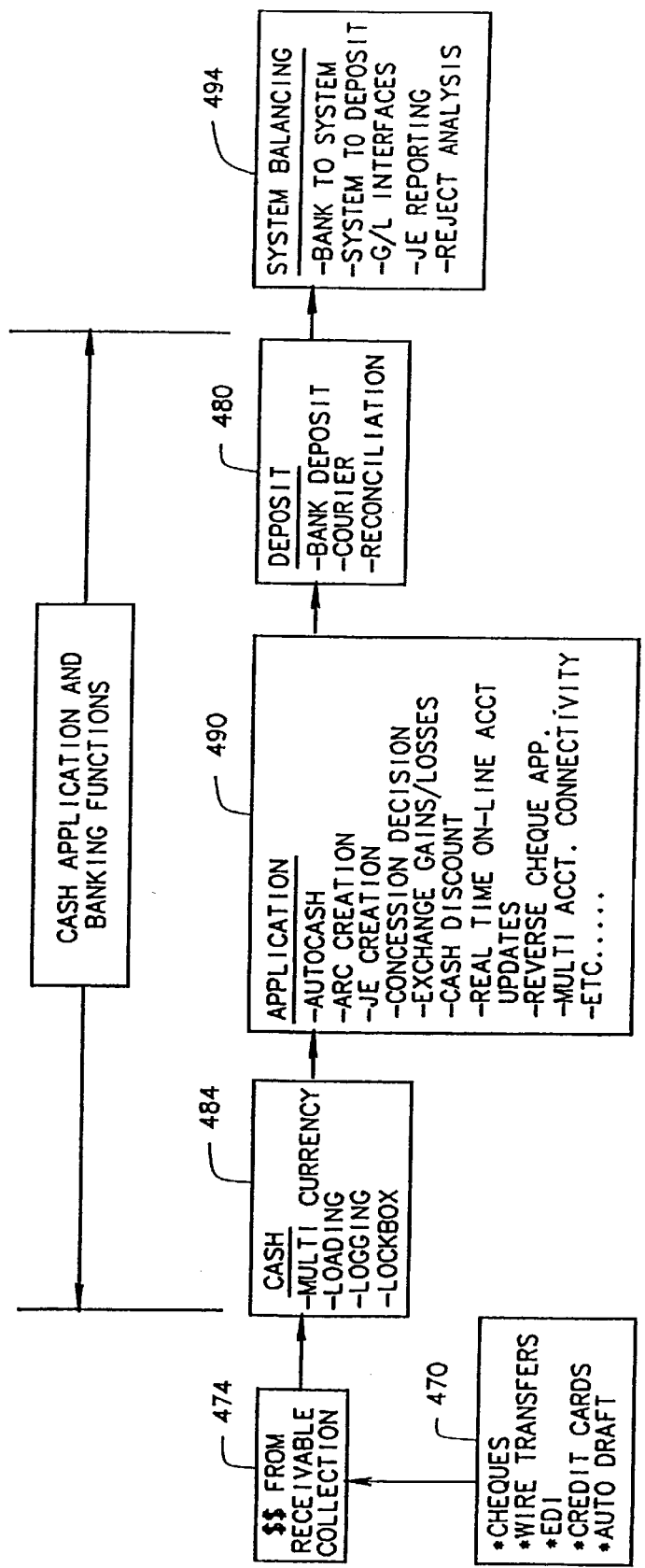
FIG. 11 is an activity diagram of the ARS shown in FIG. 3, for remittance processing.

FIG. 11 is an activity diagram for remittance processing. In most cases, the customer remits to the business entity the payment 470 on invoices through checks, wire transfers, electronic deposits, credit cards or drafts. ARS 10 receives the payments 474 and deposits them 480 in client's bank account.

Remittance Processing Module 194 of ARS 10 generally applies payments 474 to the invoice(s) 440 to which the customer wishes the payment to be applied. If remittance instructions are not received by ARS 10, the cash received is treated as On Account Unapplied Cash. ARS 10 automatically sends a letter to customers who have On Account Unapplied Cash. The letter asks for instructions on how to apply the cash (and may result in a call to the customer for information). The On Account Unapplied Cash moves with the aging buckets but does not reduce the delinquency amounts until it is applied, unless specifically cross referenced by designated credit officer 224 to a particular aging bucket. The cross-references done by designated credit officer 224 reduce the balance of the aging buckets that the On Account Unapplied Cash amounts are cross-referenced to in ARS 10. ARS 10 maintains an audit trail of all cross-references made by designated credit officer 224.

Figure 14:
FIG. 14 is an exemplary embodiment of a screen layout of the ARS shown in FIG. 3, which displays the manner in which payment that has been applied by Accounts Receivable System may be subsequently reversed.

ARS 10 accepts payments 474 in multi-currency 484 and accounts for exchange gains or losses in the balancing process. ARS 10 also offers on-line remittance processing 490 so that concurrently with the application of the checks against the invoices, these invoices are shown as paid and the customer balance is updated in an on-line format. Remittance processing 490 allows for multi-account connectivity as depicted in FIG. 14 herein. During remittance processing 490, ARS identifies any cash variances, exchange losses, discounts and concessions that are allowed. ARS 10 then automatically balances payment 474 by writing the journal entry so that the appropriate cash variance, exchange variance, discount or concession journal entry is included in the receivable totals balancing 494. Remittance Processing Module 194 is balanced 494 in batch mode overnight and the appropriate journal entries are generated to update the receivable numbers in the client's G/L system 180.

ARS 10 produces numerous reports and on-line screens which remittance processors use to reconcile the amounts of payments 474 received against the amount of cash applied and the amount deposited in the bank, so that any imbalance positions are immediately discovered. ARS 10 produces a current activity file on every transaction or edit to ARS 10 and also ties in the identification code of the person who made any change within ARS 10 at any time. This file is archived to a storage media.

FIG. 12 is an exemplary embodiment of a screen layout of ARS 10, which displays a payment application 510 to a customer account. Payment application 510 permits the operator to select a method 514 to apply the payment in a particular manner, such as by account descending 516, a statement balance 520, an invoice number 522, a payment from oldest invoices 524, pay by finder number 530, an invoice search 534, etc.

FIG. 13 is an exemplary embodiment of a screen layout of ARS 10, which displays the creation of a parent hierarchy record or payor hierarchy record for the subsidiary customer. Specifically, the customer record of a subsidiary 544 is interconnected to a payor 600. This provides a merging of multiple accounts in order to obtain on-line aging of customer exposure and better facilitate remittance processing.

FIG. 14 is an exemplary embodiment of a screen layout of ARS 10, which displays the manner in which payment 474 that has been applied by ARS 10 may be subsequently reversed. A previous payment application is reversed in ARS 10 by providing information relating to a customer number 610, a check reference 614, a check number 620, a lock box number 624, a batch type 630, and a batch number 634.

In an alternative embodiment, information is automatically provided by data from other screens being used to populate select fields within reverse check screens.

FIG. 15 is an exemplary embodiment of a screen layout of ARS 10, which displays the reversal of a zero application and all other records. The screen layout identifies a customer number 640, a finder number 642, and an invoice number 644 through which the operator offsets certain items to an account of customer 640 and updates the records of customer 640 on-line.

2. Concentration Monitoring

Designated credit officer 224 can monitor the account balances and activity on-line through ARS 10. Periodically, reports are generated that indicate the accounts on which action is required during the following week. Accounts are included in the report if they meet any of the exception conditions which can be changed immediately through the use of tables. ARS 10 produces numerous reports from the individual account level up to the overall client level.

3. Aging

The criteria and process used in ARS 10 aging are very definitive, with an item being classified as being past due on the day after its due date. The aging of accounts in the credit status system is automated such that customer remittances are applied on-line, and the customer's balance is updated immediately for credit control purposes. Invoices that are not delinquent are broken into two sections: Current and Not Due. Current means the invoice is due within 30 days from a defined closing date. Not-due means that the invoice is due at least 31 days from a defined closing date. Delinquent (or past due) means the invoice is unpaid at least one day after its individual due date. The main report used to identify aging is an Aged Trial Balances as well as a Trending Report.

Although the aging of accounts receivable has been described here in Remittance Processing Module 194, in another embodiment, it can be accessed or interfaced from other modules such as Credit Inquiry Module 190, ARC Module 194 or Maintenance Module 204.

4. Delinquency Management

The normal delinquency collection cycle takes place by designated credit officer 224 and is triggered by either a past due condition which is identified on a weekly exception condition run and/or an on-line inquiry screen showing a customer who has exceeded their credit line. Although there are a variety of reasons for making collection calls or reconciliation attempts, the principal reason is delinquency.

One of the biggest collection incentives are the targets imposed upon credit officers 230 for collections as a percent to available receivables (total receivable balance less not dues) as well as percent to forecasted collections (used to measure ability of credit officer 224 to set accurate targets) which are monitored and reported on a monthly basis for each credit officer 224 and which become a part of the yearly performance evaluation of credit officers 230.

Figure 16:
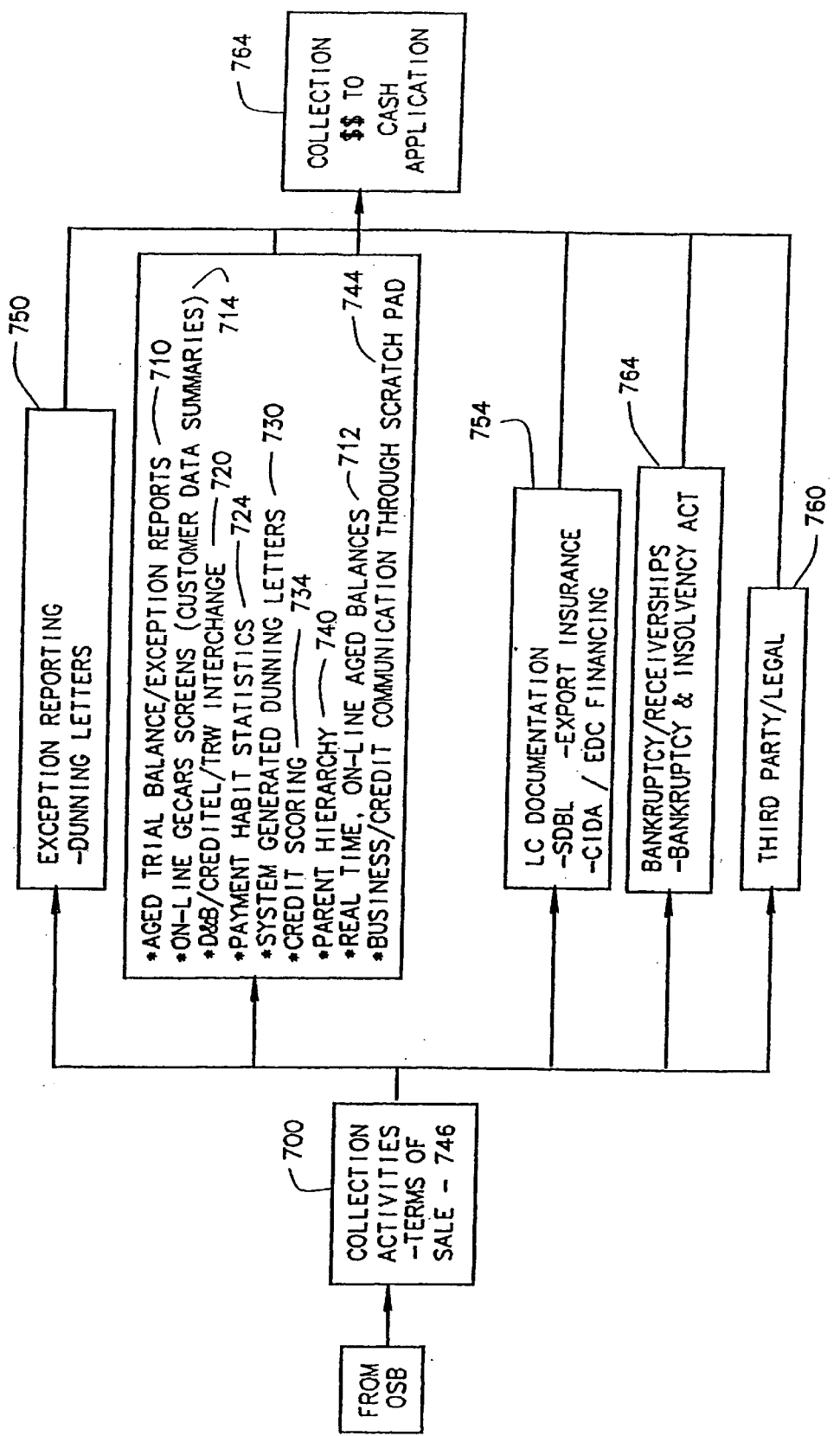
FIG. 16 is an activity diagram of the ARS shown in FIG. 3, for the collection process.

FIG. 16 is an exemplary embodiment of a simplified activity diagram of the collection process. Once accounts have been identified as requiring collection calls or preliminary investigative calls, designated credit officer 224 begins the required collection activities 700. These are reviewed based on collections as a percent to forecast and available amounts as well as delinquency ratios. Delinquent accounts are reviewed routinely by credit officers 230 with their particular District Credit Managers in order to increase the intensity and level of collection activity, if required.

Some customers require a high degree of account reconciliation which must take place between credit notes being issued, customer debit notes being deducted, ARC 654 being rejected and/or proof of delivery supplied, etc. This is done on a daily basis by designated credit officer 224 as he provides the expertise to effectively manage the portfolio so that the client's own internal measurements are achieved. There are, however, cases where concessions are made to the customer and these are normally taken up by the District Credit Managers who reviews the items in question with designated credit officer 224 and makes recommendations for concession write-offs to the Region Manager who further reviews and, if appropriate, requests sign-off by the Vice President-Finance of the client. The client has the option of delegating this to the personnel of the business entity.

ARS 10 has a variety of reports that monitor delinquencies such as an aged trial balance 710, an on-line aged balance 712, an on-line customer data summary 714, an interchange 720 from various credit agencies, payment habit statistics 724, ARS 10 generated collection letters 730 (also sometimes referred to as "dunning" letters), a credit scoring 734, a parent hierarchy 740, communications on scratch pad 744, and other reports. Payment habit statistics 724, also sometimes referred to as payment history reports, are on a per account basis, per credit officer 224 basis, per client basis, etc. These reports are generated either on-line or in a monthly format together with the weekly exception reports on collection calls that are required. They are distributed to designated credit officer 224 with monthly aged trial balance 710 being provided to the individual client involved. The "trending report" encapsulates 38 actuals of A/R information per month on a 13 month tracking trend on one sheet of paper with their top 25 customer abusers on the back page.

An account is defined as being past due or delinquent within ARS 10 on the first day beyond the agreed upon terms of sale 746. For example, an invoice billed on Jan. 1, 2000 with a term of net 30 days becomes past due and delinquent on Jan. 31, 2000 and is reported in that format. ARS 10 extracts from the billing input file the term 456 that is associated with each individual invoice and, together with its table matrix which has been approved by the client, assigns the particular due date 444. The aging on ARS 10 is measured on a day-by-day basis, which is an accurate measurement facilitating better follow-up on delinquencies.

Each month ARS 10 receives feeds from Dun & Bradstreet and other credit reporting agencies. Ownership changes, rating changes, judgments, and large decreases in Paydex or Payment Index scores are reported to designated credit officer 224 in a hard copy report. Additionally, any promises to pay made by customers are input into ARS 10. These promises also appear on-line and on the weekly exception reports.

Delinquent accounts are handled by a variety of methods depending on the size of the dollars past due and the customer history for delinquencies. Collection letters are used 750 for smaller accounts. Multiple Collection letters, of increasing (strength), may be generated after individual invoice due dates based on a variable criteria by client and at predetermined intervals. Larger or "at risk" customers typically do not pass through the collection letter process 750 and are directly contacted by phone when their accounts become past due.

Sometimes, a customer has delinquencies in the form of a reconciliation progress whereby a substantial portion of the account is paid within the normal industry standard payment terms and it is important that collection calls not irritate the customer. Designated credit officer 224 is responsible to manage the account through its life cycle and to build a customer service oriented rapport with that customer for the maximum benefit to the client. In some cases special arrangements such as having the customer pay down old balances with the purchase of new goods allows the customer to work down any outstanding obligations.

ARS 10 also reviews 754 other documentation pertaining to the delinquent account such as letter of credit 314, export insurance, and other financing documents.

Past due accounts are managed by a variety of credit officers 230 and are, in various instances, placed for collection 760 with an outside collection agency and/or lawyer prior to the request for bad debt authorization. By this, an independent third party makes an unbiased attempt at collecting the funds before writing it off as a bad debt. Customers that are bankrupt or have receivers appointed are handled 764 in accordance with the appropriate law. Generally, ARS 10 transfers such accounts to active bad debt files (discussed below). Any cash collected through collection activities 700 is processed through Remittance Processing Module 194.

FIG. 17 is an exemplary screen layout of ARS 10, which displays customer credit interchange. Although the screen layout displays an embodiment of Dun & Bradstreet reports 250, similar screens are also obtainable from other credit reporting agencies 254. ARS 10 utilizes a risk code system 766 that assigns a value from 1 to 8 based on information from trade experiences, Dun and Bradstreet, and other credit reporting agencies. If no information is available, the account is coded "N". These codes are used to override "off" switches that may be present, such as the switch to turn off collection letters, also known as Dunning letters (discussed later) or other exception conditions.

FIG. 18 is an exemplary screen layout of ARS 10 which displays customer information sorted by customer number 768. This information is accessed by designated credit officer 224 through ARS 10 during their detailed credit investigation 244 as well as on-going account review and monitoring. The customer information includes a name 770, an address 772, a telephone number 774, a Dun & Bradstreet rating 776, a risk code 778, an amount of highest credit 780, a date of last sale 782, the year-to-date sales 784, the unshipped order 786, a date customer was opened 788, a balance 790, a current balance 792, a past due balance 794, a name of parent 796, a currency 798, credit status 800, and other information.

ARS 10 reviews individual accounts on an exception basis. There is also a more formalized procedure whereby ARS 10 establishes a periodic credit update review and alerts designated credit officer 224 within a pre-determined time period prior to the lapse of the date that a review is required. This review may be simply designated credit officer's 224 mental review of the account, payment status with ARS 10, pay history, days to pay statistics, Dun & Bradstreet on-line interface information, so that an approval is input in ARS 10 to change the review date for another year. ARS 10 checks any change in the credit requirement to the individual identification code of designated credit officer 224 making the change to ensure that the credit limit of the customer has not been increased beyond the delegated authority of designated credit officer 224.

FIG. 19 is an exemplary screen layout of ARS 10, which displays the detail aging of a given customer 802 along with scratch pad notes 744. Scratch pad notes 744 include telephone or other exchange with or from customer, information regarding credits to customer, or other information. The screen layout identifies a date 804 of the last check received from customer 802 and the aging of the accounts receivable balance 806 which classifies the balance as past due for 1–30 days, 31–60 days, 61–90 days, 91–180 days, 181–365 days and over 365 days.

FIG. 20 is an exemplary screen layout of ARS 10, which displays the payment history 810 of a given customer 802. For customer 802, the screen layout identifies the net sales 812, the credit notes 814, the highest credit granted 816, a write-off amount 820, a check returned for not-sufficient funds 824 and other information, all of which information is displayed by the current semester 830, the last six months 834 and the prior six months 840.

Although delinquency management of accounts receivable has been described here in Remittance Processing Module 194, in another embodiment, it can be accessed or interfaced from other modules such as Credit Inquiry Module 190, ARC Module 200 or Maintenance Module 204.

5. Bad Debt—Write Offs and Recoveries

ARS 10 provides a sophisticated method for tracking bad debts once they are written off. In essence, when a write off to bad debt takes place, a journal entry is input to ARS 10 which simply transfers a mirror image of that customer's bad debt statement out of the normal receivable statements, generates an automatic journal entry to the client's G/L system 180 and mirror images the customer statement on an internal "active bad debt file". From the client's perspective the balance is treated as a write-off. All write-offs proposed by ARS 10 are signed off by the client's Vice President of Finance (or delegate). Bad debts principally generated from receiverships, bankruptcies, etc., are still treated as active bad debt customers. Such information is transferred to the active bad debt file on ARS 10 which does not impact the client's aged trial balances. Files are transferred to the management individual assigned responsibility for bad debt monitoring who, on a routine basis, follows up with the various trustees, receivers, collection agencies, etc., to generate some recovery. On receipt of a final disbursement letter from the trustee or receiver, or a decision is made that there is no chance of additional recovery, the District Manager prepares a recommendation to transfer these specific customers out of the active bad debt file and to consider them to be inactive bad debts, which are then consolidated and stored in off-site storage for tax and audit purposes.

ARS 10 produces monthly runs of outstanding active bad debt accounts which are controlled by the appropriate District Managers. All bad debts are signed by the District Manager, the General Manager and a client delegate of the Vice President Finance.

Bad debt provisions are calculated by ARS 10 for each year and then divided into quarters. The bad debt provision is set at the average net bad debts over the last six years. The provision is checked against actual bad debts each quarter, and provisions are also adjusted up or down each quarter, as required. Year-end bad debt provisions, as calculated on ARS 10, are then recommended to the client.

Although the write-off process has been described here in Remittance Processing Module 194, in another embodiment, it can be accessed or interfaced from other modules such as Credit Inquiry Module 190, ARC Module 200 or Maintenance Module 204.

C. Account Receivable Claims (ARC) Module

ARC Module 200 manages the Accounts Receivable Claim Process which involves identifying invoices as disputed, and sending notice of such disputes to the client for resolution through on line communication. Upon generation of a claim, ARS 20 tracks the status in multiple ways and ages disputed items until final resolution.

The following process description explains the details involved in dispute resolution and other aspects of operational functions involved in managing Accounts Receivable Claims.

1. Dispute Resolution

Figure 21:
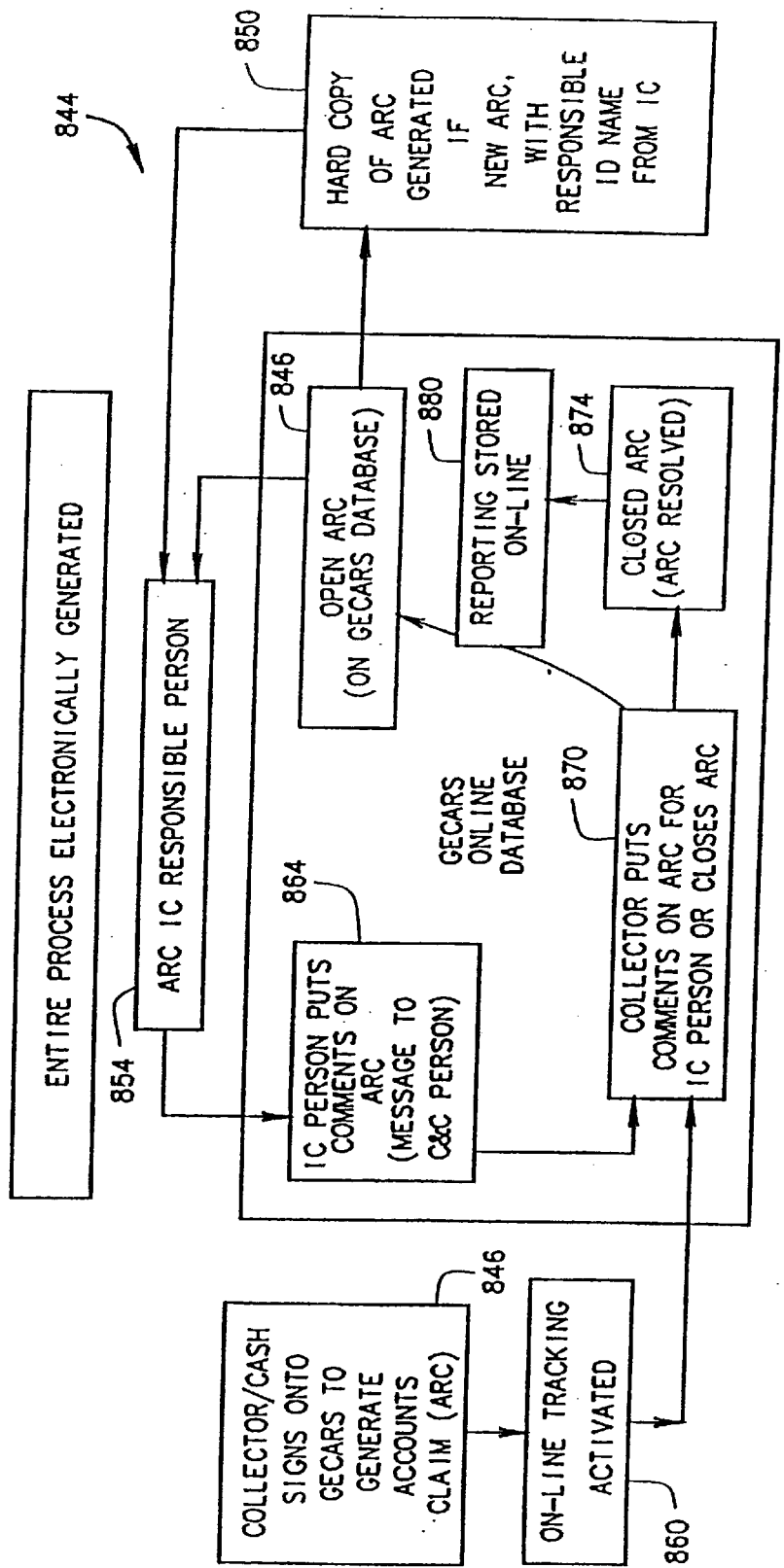
FIG. 21 is an activity diagram of the Accounts Receivable claim (ARC) procedure of the ARS shown in FIG. 3.

FIG. 21 is an activity diagram of the accounts receivable claim procedure. Disputes from customers are recorded 844 in ARC Module 200, which are instantly logged in, numbered, and filled in with the appropriate word description to generate an accounts receivable claim (ARC) 846. Based on the identification code matrix established for ARS 10, ARC 846 is immediately available on-line 850 to the responsible person within the client 854 for resolution and on-line tracking 860. Hard copies of individual disputes are also printed overnight 850 in batch mode on designated printers for each of the client's responsible persons if requested. These persons input comments 864 on-line with any credit notes that are issued to adjust the customer short payments so that prompt offsets take place for aging purposes. Designated credit officer 224 puts their comments 870 on ARC 846. Should a customer dispute be disallowed or rejected, using ARC 846 the client writes to the customer wherein the letter is laser printed on ARS 10 and mailed or faxed from the business entity's pooled location using the business entity's mailing volumes and procedures. These letters are electronic and become a part of ARC 846 for follow-up and audit purposes. Once the dispute is resolved, designated credit officer 224 closes 874 ARC. Open ARC 846 is maintained, reporting stored 880 on-line for aging purposes until, collected, credited or written off.

FIG. 22 is an exemplary screen layout of ARS 10, which displays the root cause analysis 890 summarizing outstanding Accounts Receivable Claims. This screen layout identifies the customer, a responsible person 892 from the client for said customer and an aging 894 of the accounts receivable disputes balance for the customer. Aging 894 identifies if the balance is current, 2 months past due, 3 months past due, 4–6 months past due, 7–12 months past due or 12 months past due. Designated credit officer 224 or responsible person 892 identifies and inputs 896 the reason(s) for the dispute with the customer and the amount in dispute. In an alternative embodiment, the data is captured from the initial ARC setup during remittance processing. For example, the reason for the dispute may be a sales concession, invoice not per contract, pricing error, or other reasons unique to each client and maintained in tables.

D. Maintenance Module

Maintenance Module 204 is used to maintain various types of information about the customer. For example, Maintenance Module 204 maintains and allows modifications to the customer information such as name, telephone number, and address. As depicted in FIG. 14, Maintenance Module 204 also maintains and updates connectivity between separate accounts. Additionally, through Maintenance Module 204 a customer service representative, designated credit officer 224, or any other representative of the business entity accesses or updates any information pertaining to the customer interface. Maintenance Module 204 is very flexible and is accessible from Credit Inquiry Module 190, Remittance Processing Module 194, ARC Module 200 or Administration Module 210.

E. Administration Module

Administration Module 210 deals with normal system administrator's functions including the maintenance of the security of the system. Additionally, Administrative Module 210 is utilized in updating various data and tables both during a nightly batch process and during on-line processing. Managers and supervisors have authority to access Administration Module 210 to update various records relating to the clients and their customers.

Figure 23:
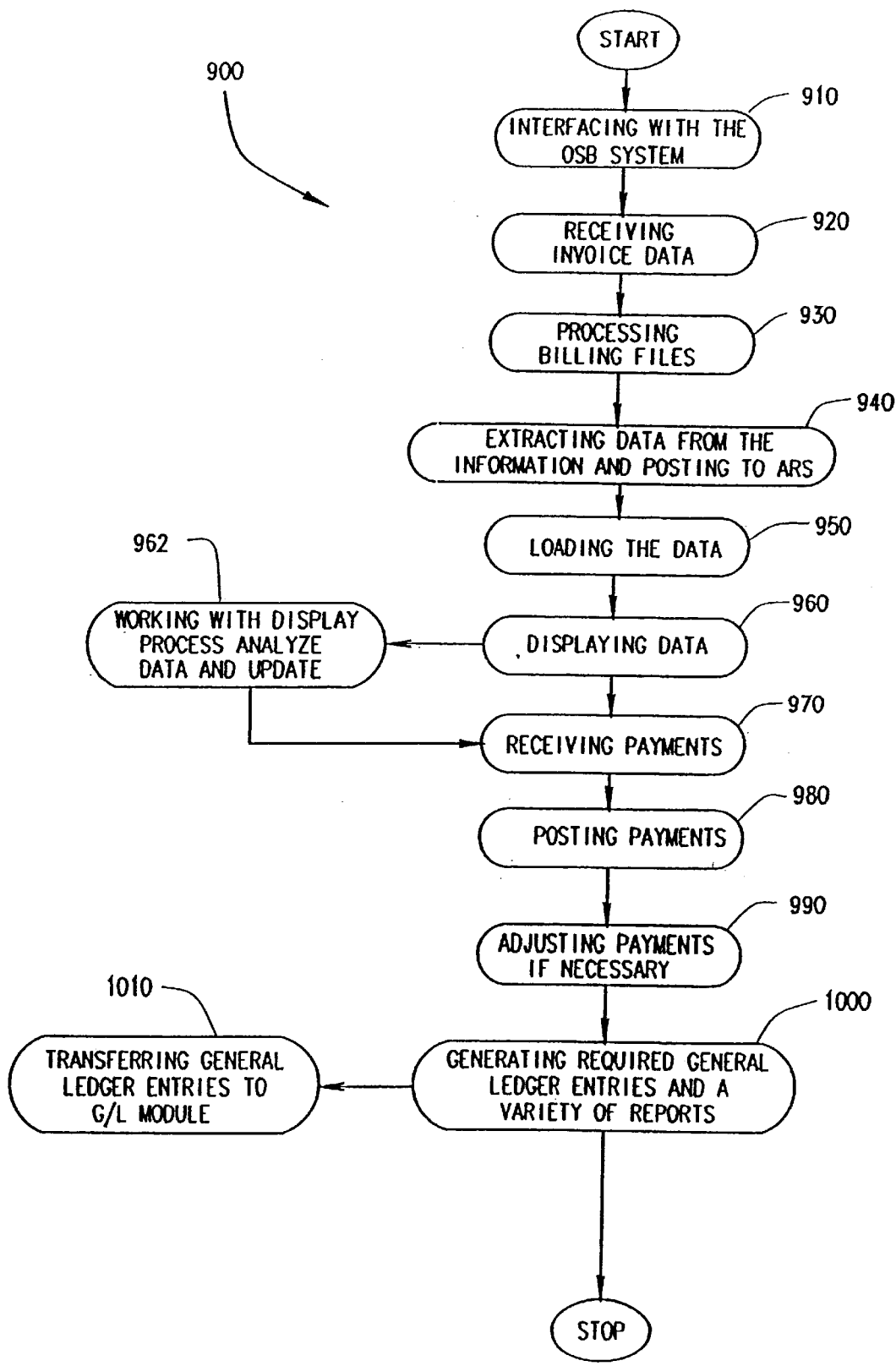
FIG. 23 is a process flow chart for the ARS shown in FIG. 3.

FIG. 23 is a process flow chart 900 summarizing the functionality of ARS 10. The first step of the process involves interfacing 910 with OSB system 20 to exchange and download the required data. After receiving 920 the invoice data, ARS 10 processes 930 billing files. ARS 10 extracts 940 data from the received information and posts the data to ARS 10 where it is then available to authorized users of ARS 10 business entity and client system 14. Data is then loaded 950 and displayed 960 on client system 14 or any other devices attached to ARS 10 for analysis and processing 962. Once the payment is received 970 from the customer, the payment is posted 980 to a proper customer account through ARS 10. ARS 10 personnel having the authority to adjust 990 or move the payment from one account to another, in the event of an error. Once the payment is posted and the account is updated, ARS 10 generates 1000 the required general ledger entries and transfers 1010 the same to post on client's G/L system 180. ARS 10 then downloads and displays general ledger entries as well as other information relating to the client or client's customers on devices 14 or client's work station 88. The information retrieved from OSB 20 as well as information generated by ARS 10 between various steps is stored in Database 94 on disk storage unit 38.

While the invention has been described in terms of various specific embodiments, those skilled in the art will recognize that the invention can be practiced with modification within the spirit and scope of the claims.

What is claimed is:

1. A method for managing trade receivables credit and collection services using an accounts receivable system, said method comprising the steps of:

providing a plurality of customer devices;

controlling a device by a business enterprise, the business enterprise having a client wherein the business enterprise and the client are separate and distinct business entities, the client having customers wherein the client and the customers are separate and distinct business entities, wherein the business enterprise device configured with a browser;

connecting a server system associated with and under the control of the business enterprise to the business enterprise device, wherein the business enterprise manages trade receivables credit for the client, manages collection services for the client, and updates a general ledger of the client;

connecting in communication a client system associated with and under the control of the client with each of the business enterprise device, the server system, and the plurality of customer devices, the client system manages ordering of products by customers using the plurality of customer devices, images shipping of products to customers, and manages billing for ordered products; and providing a data storage device for storing information pertaining to a plurality of clients of the business enterprise and a plurality of customers of the clients; and the server system retrieves information from the client system and the business enterprise device, process processes the information, generates required journal entries to post on the client's general ledger, generates a variety of reports for financial monitoring, reporting and auditing purposes, and posts the journal entries on the client's general ledger via said client system.

2. A method according to claim 1 wherein said step of connecting in communication a client system associated with and under the control of the client further comprises the step of connecting in communication a client system associated with and under the control of the client wherein the client system is an Order, Ship, Bill (OSB) system of the client.

3. A method according to claim 1 wherein said step of the server system retrieves information from the client system and the business enterprise device further comprises the steps of:
the server system downloads journal entries and a variety of reports, and displays journal entries and the variety of reports for financial monitoring, reporting and auditing purposes.

4. A method according to claim 3 wherein said step of the server system displays journal entries further includes the step of using the server system to display information in flexible output formats including word processing and Plain Text Format.

5. A method according to claim 3 wherein said step of the server system displays journal entries further includes the step of using the server system to display at least one of trade receivables, customer credit and collection issues, credit evaluation, credit granting status, status of customer collection and account reconciliation, cash receipt, remittance processing and banking issues, receivables consolidation, and general ledger entries.

6. A method according to claim 3 wherein said step of the server system displays journal entries further includes the step of using the server system to display at least one of currency of invoice, due date of invoice, payment terms of invoice, amounts of invoice, invoice number, billing indent recognition code, customer identification number, and customer purchase order number.

7. A method according to claim 3 wherein said step of the server system downloads journal entries further includes the step of using the server system to generate a comprehensive list of available reports.

8. A method according to claim 3 wherein said step of the server system displays journal entries further includes the step of using the server system to display a list of customer service experts available to solve a customer problem.

9. The method according to claim 1 wherein the business enterprise device is coupled to the server system by at least one of a wide area network, a local area network and the Internet, said step of connecting in communication a client system further comprises the steps of:
establishing a communication link between the client system and the server system; and
authenticating the client system.

10. The method according to claim 3 wherein said step of the server system displays journal entries further includes using the server system to display on the client system an HTML document provided by the server system.

11. The method according to claim 1 wherein said step of connecting in communication a client system further comprises the steps of authenticating and validating the users.

12. The method according to claim 1 wherein said step of connecting in communication a client system furthers comprises the steps of:
communicating with the client system regarding a customer;
providing an instant credit decision for the customer on-line; and
posting the credit decision on-line for access to other departments involved in managing the customer account.

13. A method according to claim 1 wherein said step of the server system retrieves information further comprises the steps of:
processing at the server system billing files received from the client system;
generating at the server system electronic billings to the client's customers;
a receiving electronic payments including credit card payments from the customers on a secured network;
posting electronic payments to the proper customer account; and
adjusting customer payments in the event of an error including completely reversing the payment from one account to another to properly reflect the customer account.

14. A method in accordance with claim 13 wherein said step of the server system processes the information further comprises the step of processing information at the server system utilizing five modules comprised of:
a Credit Inquiry Module to perform credit evaluations on the customer and conduct other credit related inquiries;
a Remittance Processing Module to handle application of remittances and other related functions including customer delinquencies;
an Account Receivable claims Module to manage customer disputes;
a Maintenance Module to maintain and update various types of information relating to the customers; and
an Administration Module to handle accounts receivable system security and other high level functions, the Administration Module integrated with the Credit Inquiry Module, the Remittance Processing Module, the Account Receivable claims Module and the Maintenance Module to perform the required functions on-line to manage trade receivables.

15. An accounts receivable system comprising:
a plurality of customer devices;
a device associated with and under the control of a business enterprise, the business enterprise having a client wherein the business enterprise and the client are separate and distinct business entities, the client having customers wherein the client and the customers are separate and distinct business entities, wherein said business enterprise device configured with a browser;
a server system associated with and under the control of the business enterprise connected to said business enterprise device, wherein the business enterprise manages trade receivables credit for the client, manages collection services for the client, and updates a general ledger of the client;
a client system associated with and under the control of the client in communication with each of said business enterprise device, said server system, and said plurality of customer devices, said client system manages ordering of products by customers using said plurality of customer devices, manages shipping of products to customers, and manages billing for ordered products; and
a data storage device for storing information pertaining to a plurality of clients of the business enterprise and a plurality of customers of the clients; and said server system retrieves information from said client system and said business enterprise device, processes said information, generates required journal entries to post on the client's general ledger, generates a variety of reports for financial monitoring, reporting and auditing purposes, and posts the journal entries on the client's general ledger via said client system.

16. An accounts receivable system according to claim 15 wherein said server system is configured with:

a download component for downloading journal entries and a variety of reports;

a display component for displaying the journal entries and the variety of reports;

a transmit component for transmitting required information to the client system and for posting the journal entries on the client's general ledger via the client system; and a printing component for printing journal entries and the variety of reports downloaded and displayed by the respective server components.

17. An accounts receivable system according to claim 16 wherein the transmit component is further configured to function in response to at least one of a voice command or a click of a mouse button.

18. An accounts receivable system of claim 15 wherein said system is protected from access by unauthorized individuals.

19. An receivable system according to claim 15 wherein said server system is configured with:

a Credit Inquiry Module to perform credit evaluations on the customer and conduct other credit related inquiries;

a Remittance Processing Module to process payments remitted by a customer to the client for at least one of services and goods provided by the client to the customer, and monitor delinquent customer accounts;

an Account Receivable claims Module to manage customer disputes;

a Maintenance Module to maintain and update information relating to the customers stored within the data storage device; and an Administration Module to handle accounts receivable system security and other high level functions, said Administration Module integrated with said Credit Inquiry Module, said Remittance Processing Module, said Account Receivable Claims Module and said Maintenance Module to perform the required functions on-line to manage trade receivables.

20. An accounts receivable system according to claim 19 wherein said server system is further configured with an audit module for monitoring user's activities including successful and failed log-ins, time stamps, password changing, remote ID's.

21. An accounts receivable system according to claim 15 wherein said server system is configured with a processing component for searching and processing received requests against the data storage device.

22. An accounts receivable system according to claim 15 wherein said server system is configured with a retrieving component to retrieve information from the data storage device.

23. An accounts receivable system according to claim 19 wherein said server system is further configured with an information fulfillment component that downloads the requested information after retrieving from the data storage device to a plurality of users in the order in which the requests were received by the receiving component.

24. An accounts receivable system according to claim 16 wherein the printing component is configured to print the information in a predetermined format.

25. An accounts receivable system according to claim 15 wherein said server system is configured to protect said data storage device from access by unauthorized individuals.

26. An accounts receivable system according to claim 15 wherein said business enterprise device is configured as a server for a network of client systems.

27. An accounts receivable system according to claim 15 wherein said server and said business enterprise device are connected via a network.

28. An accounts receivable system according to claim 27 wherein said network is one of a wide area network, a local area network and the Internet.

29. An accounts receivable system according to claim 15 wherein said client system is an Order, Ship, Bill (OSB) system of the client.

* * * * *